(12) United States Patent
Zhu et al.

(10) Patent No.: US 7,636,754 B2
(45) Date of Patent: Dec. 22, 2009

(54) RICH MULTI-MEDIA FORMAT FOR USE IN A COLLABORATIVE COMPUTING SYSTEM

(75) Inventors: Min Zhu, Los Altos, CA (US); Songxiang Wei, San Jose, CA (US); Alfred Lian Fui Pong, Millbrae, CA (US)

(73) Assignee: Cisco Technology, Inc., San Jose, CA (US)

( * ) Notice: Subject to any disclaimer, the term of this patent is extended or adjusted under 35 U.S.C. 154(b) by 714 days.

(21) Appl. No.: 10/104,170

(22) Filed: Mar. 21, 2002

(65) Prior Publication Data

US 2003/0182375 A1 Sep. 25, 2003

(51) Int. Cl.
G06F 15/16 (2006.01)
(52) U.S. Cl. .................... 709/205; 709/204
(58) Field of Classification Search .......... 709/204–205
See application file for complete search history.

(56) References Cited

U.S. PATENT DOCUMENTS

| | | | |
|---|---|---|---|
| 4,654,484 A | 3/1987 | Reiffel et al. ............... 379/53 |
| 5,434,852 A | 7/1995 | LaPorta et al. ............ 370/58.2 |
| 5,577,188 A | 11/1996 | Zhu ........................ 395/326 |
| 5,623,603 A | 4/1997 | Jiang et al. ............ 395/200.04 |
| 5,764,901 A | 6/1998 | Skarbo et al. .......... 395/200.34 |
| 5,805,804 A | 9/1998 | Laursen et al. ......... 395/200.02 |
| 5,829,001 A | 10/1998 | Li et al. ..................... 707/10 |
| 5,887,170 A | 3/1999 | Ansberry et al. ............ 395/687 |
| 5,892,946 A | 4/1999 | Woster et al. .............. 395/680 |
| 5,916,302 A | 6/1999 | Dunn et al. ................ 709/204 |
| 5,944,791 A | 8/1999 | Scherpbier ................. 709/218 |
| 5,974,446 A | 10/1999 | Sonnenreich et al. ....... 709/204 |
| 5,996,002 A | 11/1999 | Katsurabayashi et al. ... 709/204 |
| 6,038,593 A | 3/2000 | Huckins ..................... 709/217 |
| 6,055,574 A | 4/2000 | Smorodinsky et al. ...... 709/226 |
| 6,058,416 A | 5/2000 | Mukherjee et al. ......... 709/203 |
| 6,167,432 A | 12/2000 | Jiang ......................... 709/204 |
| 6,489,980 B1 * | 12/2002 | Scott et al. ................. 715/854 |
| 6,760,749 B1 * | 7/2004 | Dunlap et al. .............. 709/204 |
| 6,909,708 B1 * | 6/2005 | Krishnaswamy et al. .... 370/352 |
| 7,111,306 B1 * | 9/2006 | Laemmle et al. ........... 719/319 |
| 7,526,525 B2 * | 4/2009 | Hagale et al. ............... 709/204 |
| 2005/0080850 A1 * | 4/2005 | Salesky et al. ............. 709/204 |
| 2005/0169197 A1 * | 8/2005 | Salesky et al. ............. 370/260 |
| 2005/0246752 A1 * | 11/2005 | Liwerant et al. ........... 725/109 |

OTHER PUBLICATIONS

"A Primer on the T.120 Series Standards," http://mail.symuli.com/t120primer/t120primer.html., pp. 1-19, printed Mar. 12, 2002.

(Continued)

Primary Examiner—Nathan J Flynn
Assistant Examiner—Mohamed Wasel
(74) Attorney, Agent, or Firm—Cesari and McKenna LLP

(57) ABSTRACT

A system, method, and article of manufacture that allow a document containing custom objects to be shared in a distributed collaborative computer system. This is accomplished by allowing custom objects to be embedded in a document. When the document is to be shared, the document with custom objects is converted to a Rich Multi-Media (RMM) format. Furthermore, the converted document may be shared during a collaborative session among multiple computers. Alternatively, the converted document may be viewed by a user independent of a collaborative session.

13 Claims, 28 Drawing Sheets

OTHER PUBLICATIONS

Meyer et al., "A MOO-Based Collaborative Hypermedia System for WWW," Internet Publication.

Roberts-Witt, Sarah L., Internet World, "Online Collaboration Tools Maker Targets a Maturing Market," Jun. 15, 2000.

Novitski, B.J., Computer Graphics World, "Team Building," Apr. 1, 2000.

Caton, Michael, PC Week, "Easy Access, Low Cost Make Collaboration a Good Outsourced Fit," Feb. 28, 2000.

Downs et al., Open Systems Today, "The Net as a Vehicle for Business Data Sharing," Apr. 25, 1994.

Selvaratnam, Nirooban, "Overview of Programming Languages and Support Tools for Distributed Programming," Internet Publication.

Mates et al., "The Web Meets MOOs, IRC and the Mbone," Jun. 8, 1995, Internet Publication.

Ly, Eric, "Distributed Java Applets for Project Management on the Web," May/Jun. 1997, IEEE Internet Computing Online, vol. 1, No. 3, Internet Publication.

Gall et al., "Promondia: A Java-Based Framework for Real-Time Group Communication in the Web," Apr. 7-11, 1997, Internet Publication.

Boyd, Lane, "Taking Collaboration into Orbit," Computer Graphics World, Sep. 1998.

* cited by examiner

RICH MULTI-MEDIA FORMAT FOR USE IN A COLLABORATIVE COMPUTING SYSTEM

CROSS-REFERENCE TO CD-ROM APPENDIX

An Appendix containing a computer program listing is submitted on a compact disk, which is herein incorporated by reference in its entirety. The total number of compact discs including duplicates is two. Appendix A, which is part of the present specification, contains a list of the files contained on the compact disk. These listings contain material that is subject to copyright protection. The copyright owner has no objection to the facsimile reproduction by anyone of the patent document or the patent disclosure, as it appears in the patent and trademark office patent file or records, but otherwise reserves all copyright rights whatsoever.

BACKGROUND OF THE INVENTION

1. Field of the Invention

The present invention relates generally to collaborative computing systems and, more particularly, to embedding different types of files into a document, converting the document to a Rich Multi-Media (RMM) format, and sharing the converted document in a collaborative computing system.

2. Related Art

Traditional collaborative computing tools allow computer users at different locations to communicate via a computer network and share documents or applications stored and/or executed on one of the user's computers. While both peer-to-peer and client-server communication models have been used in the past, web-based collaborative tools generally employ a client-server model.

For example, client-server application sharing (also discussed in the context of "distributed computing") is described in U.S. Pat. No. 5,434,852 "Distributed Processing Architecture for Control of Broadband and Narrowband Communication Networks;" U.S. Pat. No. 5,887,170 "System for Classifying and Sending Selective Requests;" and U.S. Pat. No. 6,038,593 "Remote Application Control for Low Bandwidth Application Sharing," all incorporated herein by reference in their entireties. Other group communication techniques are described by Ulrick Hall and Franz J. Hauck, "Promondia: A Java-Based Framework for Real-time Group Communication in the Web," Proceedings of Sixth International World Wide Web Conference (Apr. 7-11, 1997); Lane Boyd, "Taking Collaboration Into Orbit," Computer Graphics World, Vol. 21, No. 9, p. 36 (September 1998); and Eric Ly, "Distributed Java Applets for Project Management on the Web," IEEE Internet Computing Online, Vol. 1, No. 3 (May/June 1997), all incorporated herein by reference in their entireties.

International Telecommunications Union (ITU) Standard T.120 is a family of open standards that provides both communications and applications protocols to support real-time multipoint data communications for collaboration and conferencing, among other uses. This standard is outlined in "A Primer on the T.120 Series Standard" by DataBeam Corp. (available at http://mail.symuli.com/t120primer/t120primer.html), incorporated herein by reference in its entirety.

Traditional collaborative tools, however, are limited in the types of documents that they allow to be shared. For example, a Word® document may be shared, but the document typically only contains text. That is, traditional collaborative tools do not allow sharing of documents with embedded custom objects. Accordingly, there is a need for an improved collaborative computing system.

SUMMARY OF THE INVENTION

The system, method, and article of manufacture of the present invention provide a distributed collaborative computer system that allows a document containing custom objects to be shared. This is accomplished by providing software to allow custom objects to be embedded in a document. When the document is to be shared, provided software converts the document to a Rich Multi-Media (RMM) format. With use of the provided software, the converted document may then be shared during a collaborative session. As a result, the system, method, and article of manufacture of the present invention allow a presenter at one computer to create a document with different types of embedded custom objects. During a collaborative session, the presenter controls the viewing of the document, and users (e.g., attendees) at other computers view the document in synch with the presenter. The Rich Multi-Media format provided by the present invention enables the embedded custom objects to be viewed at the users' computers. Furthermore, the converted document may be viewed by a user independent of a collaborative session.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION OF THE INVENTION

Embodiments of the present invention provide the ability to embed custom objects into a document and convert the document into a Rich Multi-Media (RMM) format so that it may be shared during an on-line meeting (i.e., a collaborative session). Various types of custom objects, such as multimedia objects, may be embedded in the document. The document is created with an application program, such as Microsoft's PowerPoint®). Embodiments of the invention provide the Rich Multi-Media format that is used for conversion of the document into a form that may be shared during a meeting. Additionally, the document with embedded custom objects may be viewed by a user independent of an on-line meeting.

Figure 1:
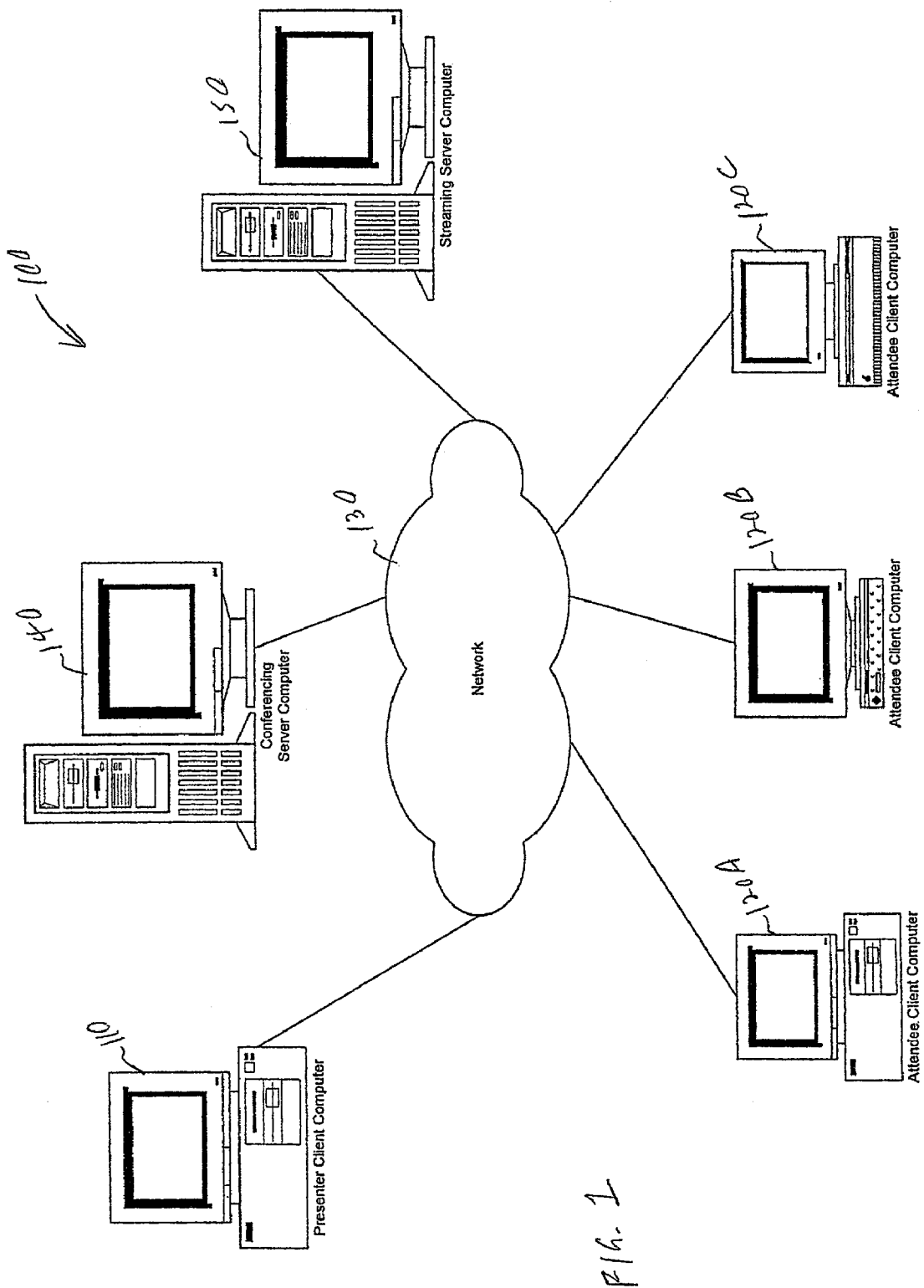
FIG. 1 illustrates a distributed collaborative computing system, in accordance with some embodiments of the invention

FIG. 1 illustrates a distributed collaborative computing system 100, in accordance with some embodiments of the invention. Computer system 100 includes a presenter client computer 110, a plurality of attendee client computers 120n (where n=A, B, C . . . ), a conferencing server computer 140, and a streaming server computer 150 connected to each other through a computer network 130.

In some embodiments of the invention, presenter client computer 110 (whose user will be a presenter at a meeting) establishes a connection to conferencing server computer 140 over computer network 130. Each attendee client computer 120n (whose users will join the meeting presented by presenter client computer 110) establishes a connection to conferencing server computer 140 over computer network 130. Additionally, each client computer 110 and 120n establish connections to streaming server computer 150 to obtain data during the meeting. In some embodiments, a host schedules a meeting to be presented by a presenter. The host and presenter may be the same user or may be different users. In some embodiments, the host, the presenter at presenter client computer 110, and users at attendee client computers 120n are referred to as attendees as all of them attend the meeting.

Details of distributed collaborative computing system 100 are further described in the following United States patent applications and patents, each of which is incorporated herein by reference in its entirety:

"System and Method for Accessing a Target Computer from a Remote Location Using a Remote Computer," co-pending and commonly assigned application Ser. No. 10/001,435, filed on Oct. 31, 2001;

"Systems and Methods for Establishing Quasi-Persistent HTTP Connections," co-pending and commonly assigned application Ser. No. 09/963,216, filed on Sep. 25, 2001;

"Application Based Screen Sampling," co-pending and commonly assigned application Ser. No. 09/835,079, filed on Apr. 13, 2001;

"Sharing OpenGL Applications Using Application Based Screen Sampling," co-pending and commonly assigned application Ser. No. 09/835,116, filed on Apr. 13, 2001;

"Sharing Directdraw Applications Using Application Based Screen Sampling," co-pending and commonly assigned application Ser. No. 09/835,086, filed on Apr. 13, 2001;

"Distributed Network System Architecture For Collaborative Computing," co-pending and commonly-assigned application Ser. No. 09/751,424, filed Dec. 29, 2000;

"Fault-Tolerant Distributed System For Collaborative Computing," co-pending and commonly-assigned application Ser. No. 09/751,807, filed Dec. 29, 2000;

"Scalable Distributed System For Collaborative Computing," co-pending and commonly-assigned application Ser. No. 09/751,548, filed Dec. 29, 2000;

"Distributed Meeting Management," co-pending and commonly-assigned application Ser. No. 09/751,595, filed Dec. 29, 2000;

"Fault Tolerant Server Architecture For Collaborative Computing," co-pending and commonly-assigned application Ser. No. 09/752,376, filed Dec. 29, 2000;

"Distributed Application Sharing," co-pending and commonly-assigned application Ser. No. 09/751,806, filed Dec. 29, 2000;

"Distributed Document Sharing," co-pending and commonly-assigned application Ser. No. 09/753,193, filed Dec. 29, 2000;

"Secure Communications System For Collaborative Computing," co-pending and commonly-assigned application Ser. No. 09/752,284, filed Dec. 29, 2000;

"Fault Tolerant Server For Collaborative Computing," co-pending and commonly-assigned application Ser. No. 09/751,519, filed Dec. 29, 2000;

"Quality Of Service Maintenance For Distributed Collaborative Computing," co-pending and commonly-assigned application Ser. No. 09/752,377, filed Dec. 29, 2000;

"Instant Document Sharing," co-pending and commonly-assigned application Ser. No. 09/442,424, filed Nov. 17, 1999;

"Instant Sharing of Documents in a Viewer Server," co-pending and commonly-assigned application for U.S. patent Ser. No. 09/471,938, filed Dec. 23, 1999;

"Viewer Document Serving," co-pending and commonly-assigned application Ser. No. 09/591,377, filed Jun. 9, 2000;

"Instantaneous Viewer Control of an Unattended Server," co-pending and commonly-assigned application Ser. No. 09/515,684, filed Feb. 29, 2000;

"Remote Document Serving," co-pending and commonly-assigned application Ser. No. 09/471,938, filed on Dec. 23, 1999;

"Instantaneous Remote Control of an Unattended Server," co-pending and commonly-assigned application Ser. No. 09/515,684;

"Method for Establishing a Communication Connection Between Two or More Users Via a Network of Interconnected Computers," co-pending and commonly-assigned application Ser. No. 09/195,801, filed on May 12, 2000;

"Emulating a Persistent Connection Using HTTP," co-pending and commonly-assigned application Ser. No. 09/449,011, filed on Nov. 24, 1999;

"Method of Transferring Data at Adjustable Levels of Priorities to Provide Optimum Response to User Demands," U.S. Pat. No. 5,623,603;

"Method to Provide for Virtual Screen Overlay," U.S. Pat. No. 5,577,188;

"Collaborative Web Browser," U.S. Pat. No. 5,944,791; and

"Method for Creating Peer-to-Peer Connections Over an Interconnected Network to Facilitate Conferencing Among Users," U.S. Pat. No. 6,167,432.

Figure 2A:
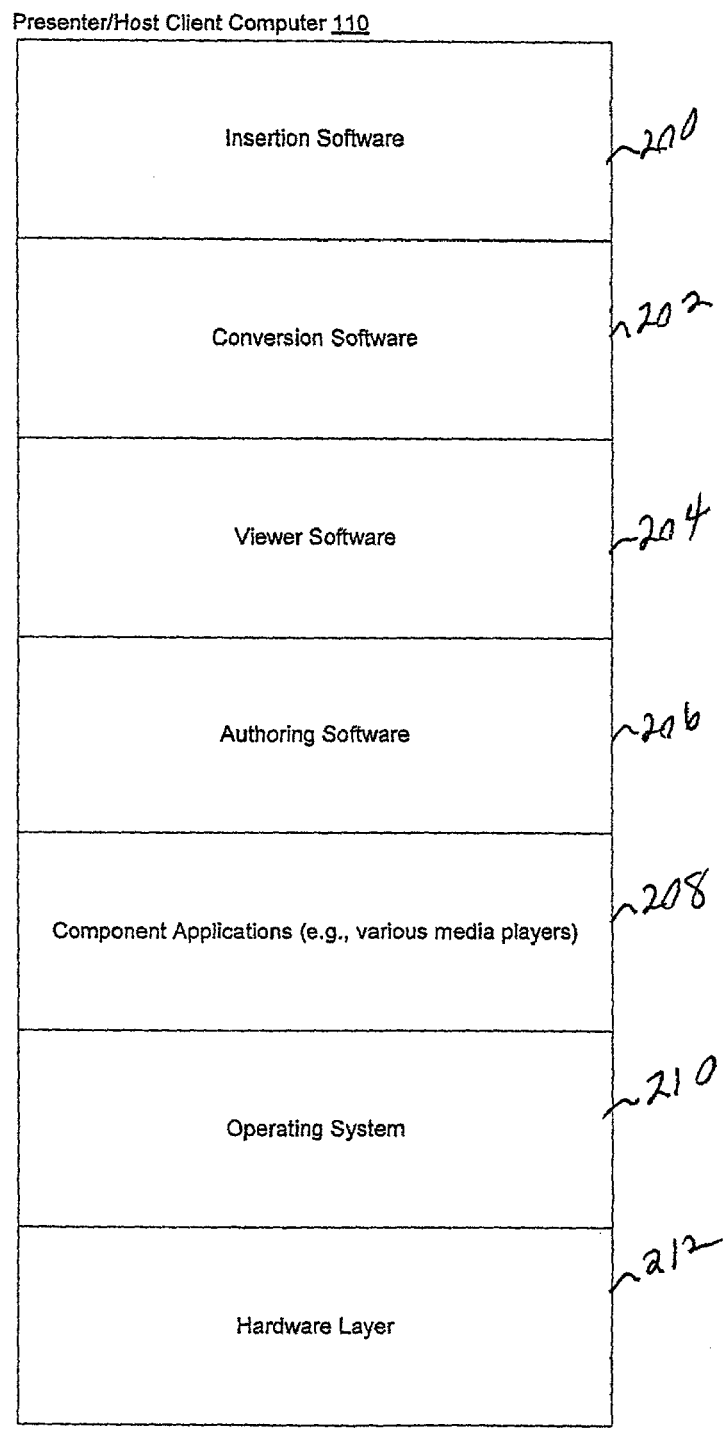
FIGS. 2A, 2B, and 2C illustrate a hardware/software structure of a presenter client computer, an attendee client computer, and a server computer, in accordance with some embodiments of the invention.

FIG. 2A illustrates a hardware/software structure of a presenter client computer 110, in accordance with some embodiments of the invention. During operation of computer system 100, insertion software 200, conversion software 202, viewer software 204, authoring software 206, and component applications 208 are executed on top of operating system 210, which in turn controls hardware layer 212. Hardware layer 212, in turn, provides a physical connection to computer network 130.

Insertion software 200 allows custom objects to be embedded into a document prepared with authoring software 206. Conversion software 202 performs conversion of the document to a Rich Multi-Media format provided by some embodiments of the invention. Viewer software 204 enables viewing of a document with embedded custom objects, either while participating in a meeting (i.e., while "on-line") or outside of a meeting (i.e., while "off-line"). In some embodiments, insertion software 200 is a plug-in that is added to authoring software 206 (e.g., Microsoft's PowerPoint® or Word®). In some embodiments, conversion software 202 and viewer software 204 are plug-ins that are added to a web browser (e.g., Microsoft's Internet Explorer®).

In some embodiments, insertion software 200, conversion software 202, and viewer software 204 may each be separate computer programs or may be combined with each other and/or with other software. For example, in some embodiments, insertion software 200, conversion software 202, and viewer software 204 are separate computer programs. In some embodiments, insertion software 200, conversion software 202, and viewer software 204 are combined to form a single computer program. In some embodiments, insertion software 200, conversion software 202, and viewer software 204 may be combined in alternate ways (e.g., conversion software 202 and viewer software 204 may be combined into one computer program, while insertion software 200 is a separate computer program) or may be combined with other software (e.g., insertion software 200 may be combined with authoring software 206 to form a simple computer program).

Figure 2B:
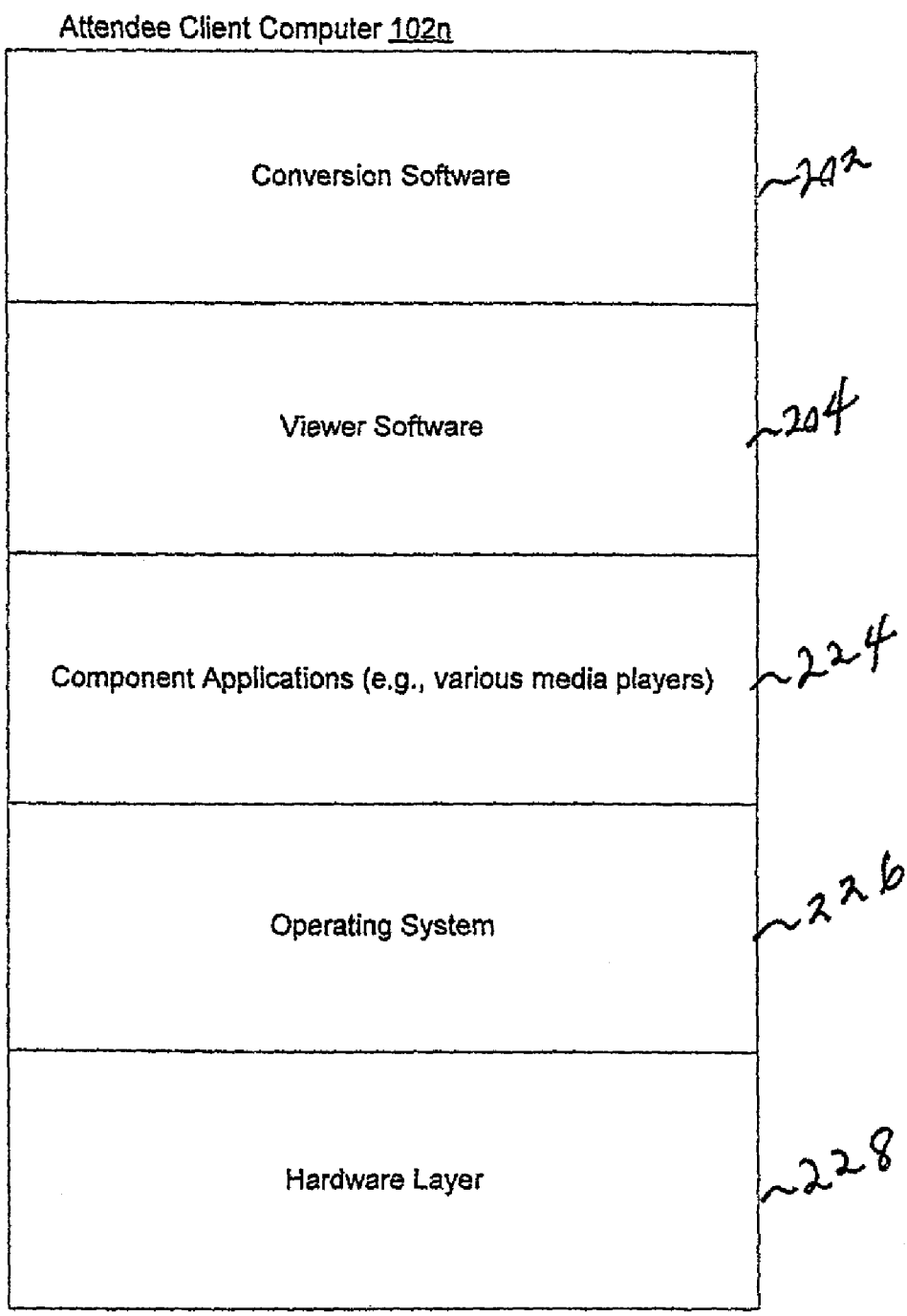

FIG. 2B illustrates a hardware/software structure of an attendee client computer 120n, in accordance with some embodiments of the invention. During operation of computer system 100, conversion software 202, viewer software 204, and component applications 224 are executed on top of operating system 226, that controls hardware layer 228. Hardware layer 228, in turn, provides a physical connection to computer network 130. Conversion software 202 and viewer software 204 may be separate computer programs, a single combined computer program, or each may be combined with each other and/or other software.

Figure 2C:
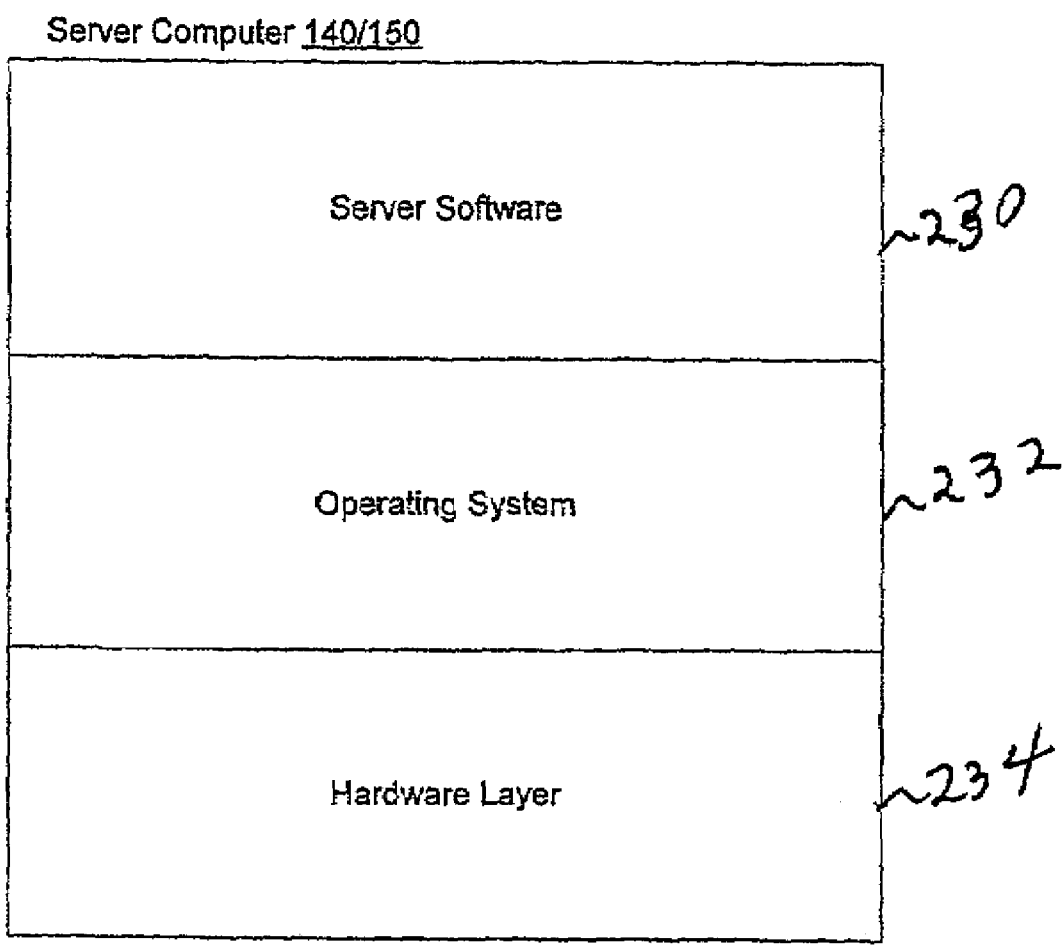

FIG. 2C illustrates a hardware/software structure of a conferencing server computer 140 or a streaming server computer 150, in accordance with some embodiments of the invention. During operation of computer system 100, server software 230 (e.g., database management software (DBMS)) is executed on top of operating system 232, that controls hardware layer 234. Hardware layer 234, in turn, provides a physical connection to computer network 130. Server software 230 stores and retrieves information in a database via operating system 232. The database may be any type of commercially available database, such as IBM's' DB2® database or an Oracle® database.

Conferencing server computer 140 and streaming server computer 150 maybe any special or general purpose computer suitable for maintaining a website and/or streaming data, such as a Pentium™-based computer, available from a variety of third parties, an UltraSparc™ workstation, available from Sun Microsystems, Inc. of Mountain View, Calif., an RS6000 workstation, available from IBM of New York, etc.

Client computers 110 and 120n may be any special or general purpose computer suitable for accessing a website over the Internet, such as any a Pentium™-based computer, available from a variety of third parties, a Macintosh computer, available from Apple Computer, Inc. of Cupertino, Calif., a handheld device or appliance, available from a variety of third parties, etc.

Operating systems 210, 226, and 232 are any suitable operating system for client computers 110 and 120n and server computers 140 and 150, such as Windows® 98, Windows® NT 4.0, Windows® 2000, or Windows® XT, available from Microsoft Corp. of Redmond, Wash., Mac® OS X, available from Apple Computer, Inc., any version of the Unix® operating system, including Linux.

Figure 3:
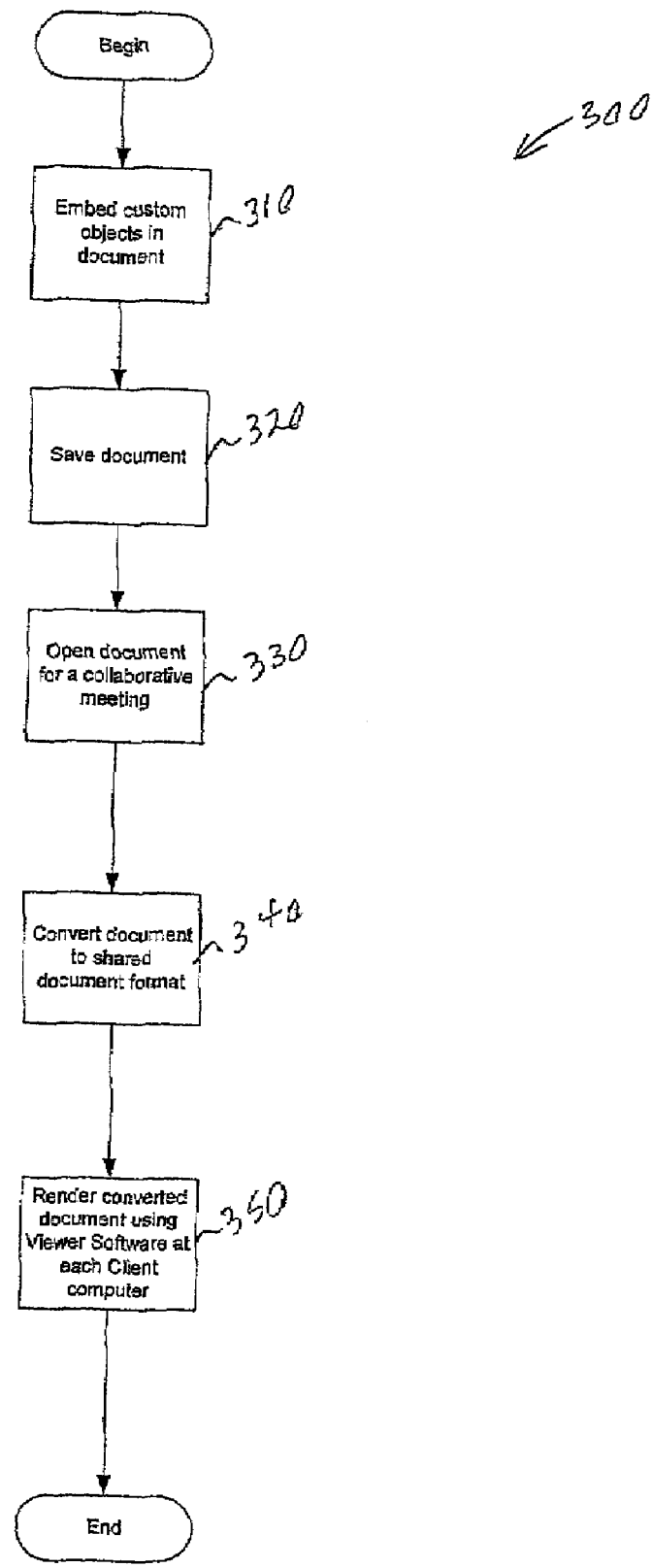
FIG. 3 is a flow diagram of an operation for creating a document and sharing the document at a meeting in a distributed collaborative computer system, in accordance with some embodiments of the invention.

FIG. 3 is a flow diagram of an operation 300 for creating a document and sharing the document at a meeting in a distributed collaborative computer system 100, in accordance with some embodiments of the invention. In stage 310, insertion software 200 embeds one or more custom objects into a document in response to user selection of the custom objects. The document is created with authoring software 206 (e.g., PowerPoint®) at presenter client computer 110. Then, in stage 320, the document (e.g., a PowerPoint® presentation) is saved. In some embodiments, the document is saved without being converted to Rich Multi-Media format, and, in other embodiments, the document is saved after being converted to Rich Multi-Media format. Next, in stage 330, the document is opened for a meeting in the distributed collaborative computer system 100. If the document was not converted to Rich Multi-Media format prior to being saved, conversion software 202 converts the document to Rich Multi-Media format at this time (stage 340). Although for purposes of illustration, presenter client computer 110 and attendee client computers 120n are described as engaged in a meeting, the document may also be viewed independent of the meeting.

In some embodiments, the custom objects in the document are not viewable by attendee client computers 120n if the document is not converted into the Rich Multi-Media format first. Then, viewer software 204 at presenter client computer 110 and attendee client computers 120n enables viewing of the converted document under direction of a user (e.g., presenter) at presenter client computer 110. In particular, viewer software 204 is able to correctly render (e.g., play or display) the custom objects at each attendee client computer 110 and 120n.

Figure 4:
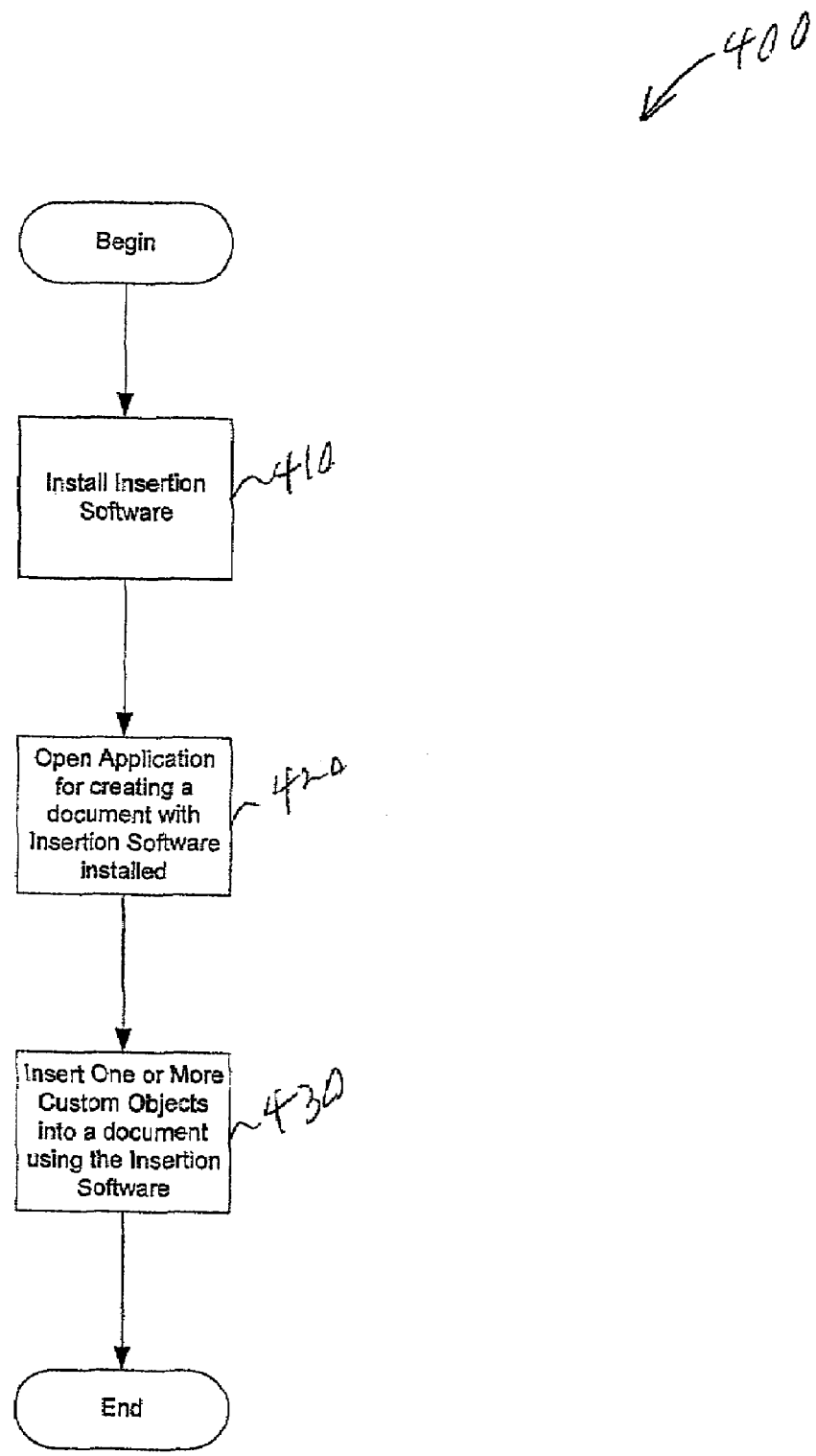
FIG. 4 is a flow diagram of an operation for embedding custom objects into a document, in accordance with some embodiments of the invention.

FIG. 4 is a flow diagram of operation 400 for embedding custom objects into a document, in accordance with some embodiments of the invention. Initially, (stage 410), insertion software 200 is installed.

In particular, for some embodiments, insertion software 200 is designed to be incorporated into authoring software, such as PowerPoint® to support the authoring of the document. In some embodiments, insertion software 200 is a plug-in that is added to PowerPoint® to provide additional functionality.

A user can use insertion software 200 to import different media files and insert them into a PowerPoint® presentation as custom objects. PowerPoint® supports custom types, and insertion software 200 takes advantage of this to import one or more objects, such as a meeting recording object, an audio object, a video object, a Flash™ movie object, or a 3D model object. When the user saves the presentation, the custom objects are embedded into the presentation by insertion software 200.

Then, embodiments of the invention allow a user to open or share the presentation with other users during an on-line meeting or to view the presentation independent of a meeting. In some embodiments, users at client computers 110 and 120n access a web site hosted by conferencing server 140, register to participate in a meeting, and download the plug-in for conversion software 202 and viewer software 204. An installation program at client computer 110 and 120n is used to install the plug-in. At the time of registration, in some embodiments, any documents to be shared during the meeting are downloaded to client computers 110 and 120n.

Then, during an on-line meeting, the invention provides the ability to synchronize playback of media files across client computers 110 and 120n. In embodiments in which the embedded custom objects are already loaded at each client computer 120n, there is no need to send large amounts of data to attendee client computers 120n during playback.

In stage 420, authoring software (e.g., PowerPoint®) is opened for creating a document with insertion software 200. After installation, when, for example, the PowerPoint® application is opened, the PowerPoint® window includes an Insertion menu 500 (labeled as "WebEx®" in some embodiments) in accordance with some embodiments of the invention. The sub-menus of Insertion menu 500 include:

Insert Meeting Recording . . . 502
  Insert Audio Object . . . 504
  Insert Video Object . . . 506
  Insert Flash Movie . . . 508
  Insert 3D Model . . . 510
  Plug-in Help 512

In some embodiments, insertion software 200 provides users the ability to insert other custom objects and code for rendering the custom objects through, for example, an application programming interface (API). Each type of custom object has its own settings that can control the playback of the custom object. In some embodiments, the file formats listed in Table 1 are supported by the Rich Multi-Media format of the invention.

TABLE 1

| Format | Extensions | Support |
|---|---|---|
| Meeting Recording | .wrf | Built-in to Viewer Software |
| Audio Files | .aif, .au, .mp2, .mp3, .wav | Requires media player |
| Video Files | .asf, .avi, .mov, .mpg, .qt | Requires media player |
| Flash Movie | .swf | Requires flash player |
| 3D Models | .igs | Built-in to Viewer Software |

In some embodiments, a meeting recording is a recording of a meeting and is a type of meeting recording object. For meeting recordings and 3D models, there is built-in support for playback in viewer software 204. For audio files and video files, viewer software 204 relies on the playback functionalities provided by the corresponding component application (e.g., media player). For Flash™ movies, viewer software 204 relies on the functionalities of a Flash™ player. For all media types, the user interface of the playback control is provided by viewer software 204, even when component applications are called to render the objects. Other media types may be supported in other embodiments.

Figure 5:
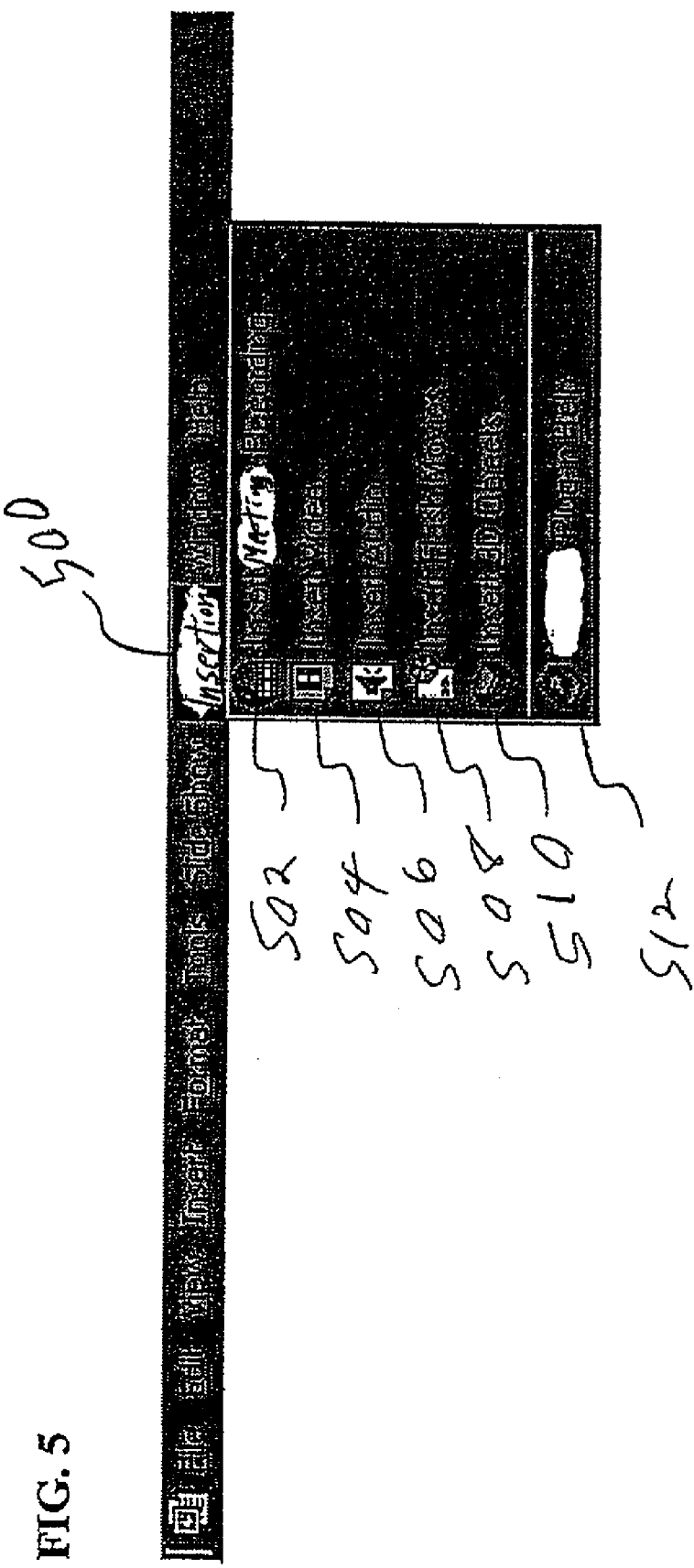
FIG. 5 illustrates an Insertion menu, in accordance with some embodiments of the invention.

The tools available in the menu of FIG. 5 may also be placed on a toolbar that may be manipulated as any other PowerPoint® toolbar. A toolbar is a row of icon buttons that provides quick access to commonly used functions.

In stage 430, one or more custom objects are inserted into a document using insertion software 200. When creating a document, if the user selects "Insert object" (e.g., Insert Meeting Recording) from either Insertion menu 500 or a toolbar, an Insert Meeting Recording File Open dialog box 600 (FIG. 6) appears on the screen. A meeting recording has a .wrf file extension 610. After the user selects a valid media file and closes the dialog box, the meeting recording object is inserted into the presentation.

Figure 7:
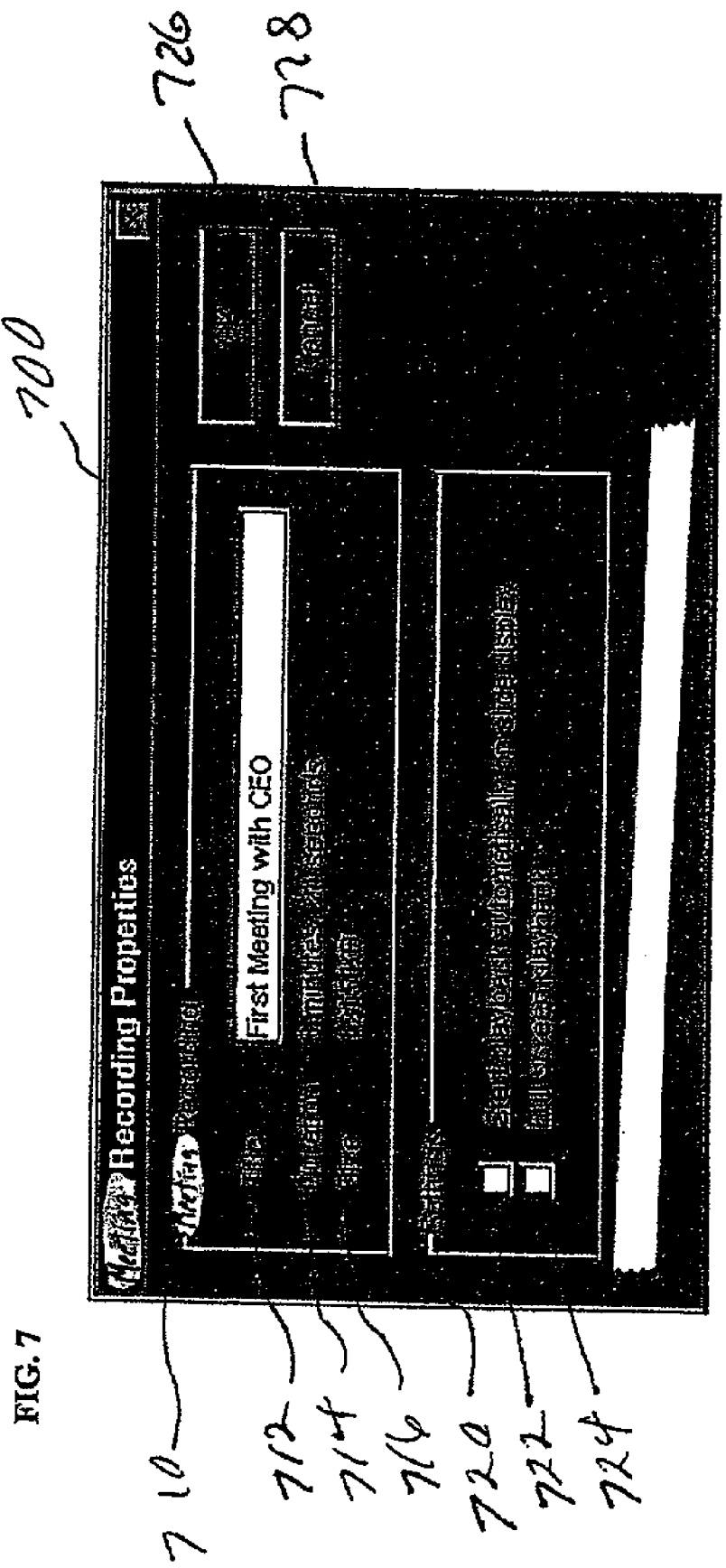
FIG. 7 illustrates a Recording Properties dialog box in accordance with some embodiments of the invention.

If a user has inserted a meeting recording object, a Meeting Recording Properties dialog box 700 (FIG. 7), in accordance with some embodiments of the invention, is displayed to allow the user to change any settings or properties for the newly inserted object. Dialog box 700 includes information about object 710 and settings 720.

Object information 710 includes a title box 712. In some embodiments, a default title is given to each object on its creation, and the user may use the default title to identify the object or may choose to modify the default title. If the media object already has a title or name embedded in it, this title is used as the default title. Otherwise, the filename without the extension may be used as the default title (e.g., file name "sept.wrf" will become default title "sept"). The title field does not need to be unique among objects. A duration field 714 indicates the exact duration of the playback in the following format: h hours, mm minutes, ss seconds (where h is number of hours, mm is number of minutes, and ss is number of seconds). A size field 716 indicates the size of the object inside the presentation expressed in kilobytes (KB).

If a "start playback automatically on slide display" option 722 is checked, the playback will start once a user enters the slide containing the object. If option 722 is not checked, the user has to manually select play. If a full-screen playback option 724 is checked, the display switches to full-screen mode once the playback starts (either automatically or manually). If option 724 is not checked, the user has to manually select the full-screen button. A full-screen typically has some menu bars and/or toolbars hidden so that a larger portion of a document may be viewed on a computer screen.

Selecting an OK button 726 confirms the currently selected properties. Also, OK button 726 is selected by default, so it can also be selected by simply pressing the Enter key on a keyboard. Selecting a Cancel button 728 discards any changes made in properties dialog box 700 (i.e., restores the default settings) but does not delete the inserted object from the document.

Figure 8:
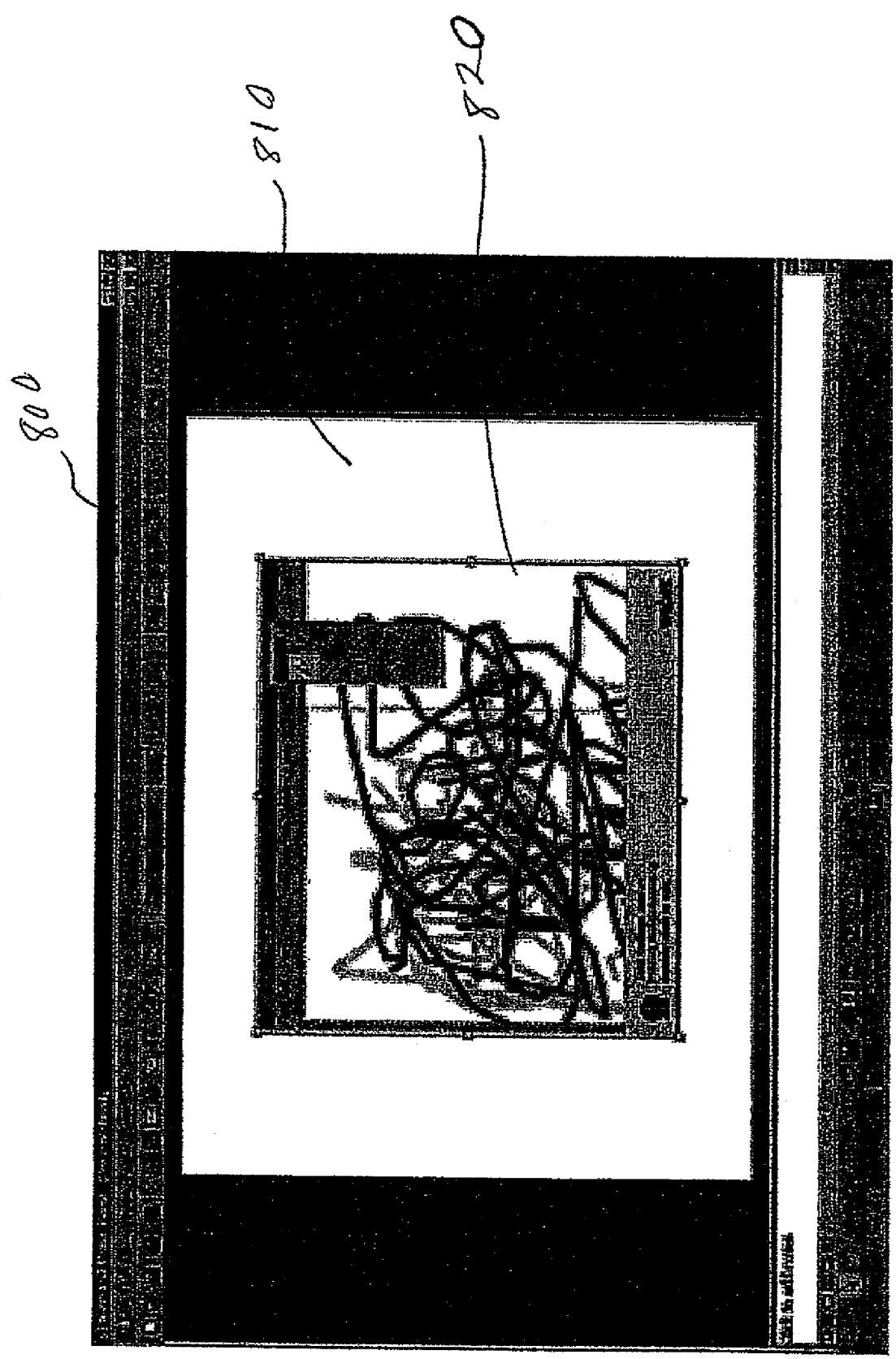
FIG. 8 illustrates a meeting recording object in a document within a PowerPoint® window, in accordance with some embodiments of the invention.

When the user has completed editing object properties, the object appears in the PowerPoint® presentation. FIG. 8 illustrates a meeting recording object 820 in a document (e.g., a presentation) 810 within a PowerPoint® window, in accordance with some embodiments of the invention.

Insertion software 200 enables custom objects to be handled in accordance with the convention of manipulating objects in a PowerPoint® presentation. For example, there are 8 square handles around the custom object. Users can grab the handles to resize the custom object. Users can move the custom object around by placing a cursor on top of the custom object and dragging the object. Users can delete the custom object by hitting the Del key on a keyboard or by selecting delete from the PowerPoint® Edit menu. Also, selecting a custom object (e.g., by double-clicking on the custom object) switches the PowerPoint® document into object editing mode.

Figure 9:
FIG. 9 illustrates further details of a meeting recording object, in accordance with some embodiments of the invention.

FIG. 9 illustrates further details of a meeting recording object 820 in accordance with some embodiments of the invention. In some embodiments, custom object 820 consists of two parts: content portion 910 displays the content of the recording, and an information panel 920 provides information about custom object 820 (in this example, a meeting recording object). Content portion 910 displays a frame of the recording in object editing mode. Information panel 920 consists of the elements listed in Table 2 in object editing mode.

TABLE 2

| Element | Description |
| --- | --- |
| Meeting Recording object icon | Identifies that this is a Meeting Recording object. Left aligned to 15 pixels from the left edge of the object. |
| Information | Consists of Title, Format, and Instruction. Left aligned to 15 pixels from the right edge of the Meeting Recording icon. |
| Title | The title of the recording object specified by the user in the Properties dialog box. |
| Format | Format: Meeting Recording ([DURATION]) Where DURATION is the total duration of the recording. The format is: hh:mm:ss where hh is number of hours, mm is number of minutes, ss is number of seconds. |
| Instruction | Double-click to edit the object. |

Figure 10:
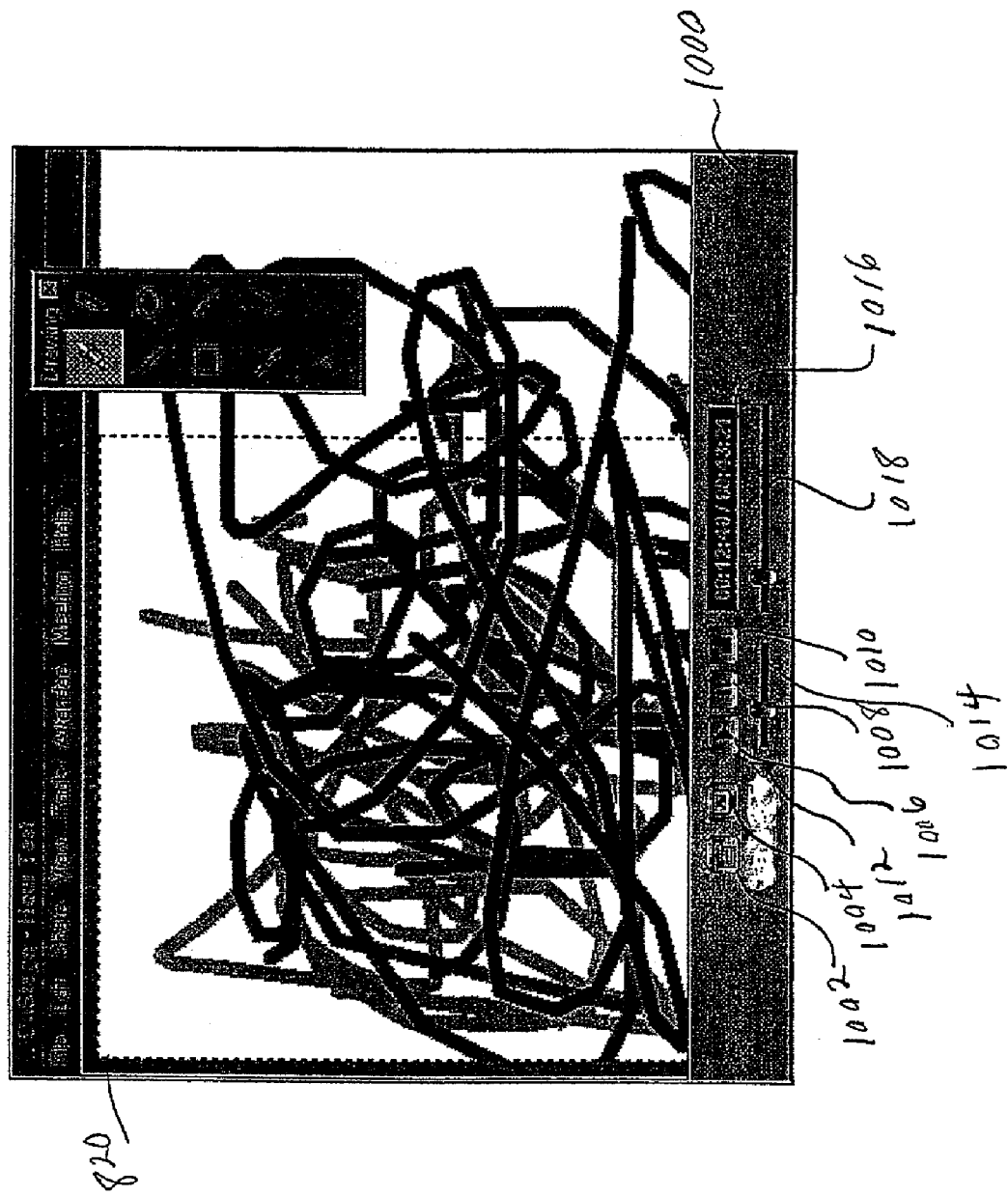
FIG. 10 illustrates a meeting recording object in object editing mode, in accordance with some embodiments of the invention.

When the custom object is selected (e.g., by double-clicking on the custom object), the information panel changes to a control panel 1000, allowing a user to playback the meeting recording object. FIG. 10 illustrates a meeting recording object 820 in object editing mode, in accordance with some embodiments of the invention. For example, the object outline changes to indicate that custom object 820 is in object editing mode. Users can drag the outline to move custom object 820, and users can resize custom object 820 by dragging the handles around custom object 820.

Table 3 describes control panel 1000 of the meeting recording object in edit mode with reference to FIG. 10.

TABLE 3

| | |
| --- | --- |
| Properties 1002 | Opens the corresponding object properties dialog box. |
| Full-screen playback 1004 | Switches to full-screen mode. |
| Play 1006 | Plays the recording. If the user has selected Full-screen playback in the Properties dialog box, switches to full-screen mode and plays the media. Otherwise, plays the media in the current object space. While the media is playing, the play button is disabled. |
| Pause 1008 | Remains in an active state as long as playback is paused—that is, until a user either clicks the button again or clicks the Play or Stop button. |
| Stop 1010 | Stops the playback and resets the current playing position. This button is enabled only when the recording is being played or paused. Clicking this button enables the Play button and disables the Pause button. |
| Mute 1012 | When the user clicks this button, audio is muted and the button changes to a down state until the user clicks it again, which resumes the audio. Disable this button if the object does not contain an audio component, or no audio devise is installed in the system to play the media. |
| Volume slider 1014 | Indicates the sound volume. This control may be disabled if there is no suitable audio device installed in the system to play back audio or the media contains no audio component. |
| Elapsed time and Duration Indicator 1016 | Shows the elapsed time during playback or editing, and the total duration of a recording— for example, 00:12:40 / 0043:43:21. |
| Location slider 1018 | Controls the location of the playback. |

When the user selects "Slide Show" in PowerPoint®, the presentation is displayed. The appearance of the object is still the same as in FIG. 10. If the user clicks the Properties button on the control panel, Properties dialog box (FIG. 7) is displayed in read-only mode.

When the user clicks the Full-screen button on the control panel of the object, the object occupies the entire screen. As a result, the control panel is not shown in this mode, to allow maximum space for viewing the content. Users can still enter control commands, however, via the keyboard. The following are the keyboard commands available in full-screen mode:

Ctrl-P: Play/Pause (toggle)
Enter: Play/Pause (toggle)
Ctrl-S: Stop
Esc: Quit full-screen mode The meeting recording object can appear with viewer software 204 if the user opens or shares a presentation that contains a custom object. For the host, the custom object behaves the same way as in slide-show mode. For attendees, all controls are disabled except Properties, the volume slider, and mute. In the Properties dialog box, all options appear dimmed (e.g., grayed or shaded) and may not be modified by the attendees.

When the user selects "Insert Audio Object . . . " from either Insertion menu 500 or a toolbar, a standard File Open dialog box, similar to that illustrated FIG. 6, appears on the screen. An audio file may have a format of, for example, the following extensions: .au, .aif, .mp2, .mp3, .wav.

Figure 11:
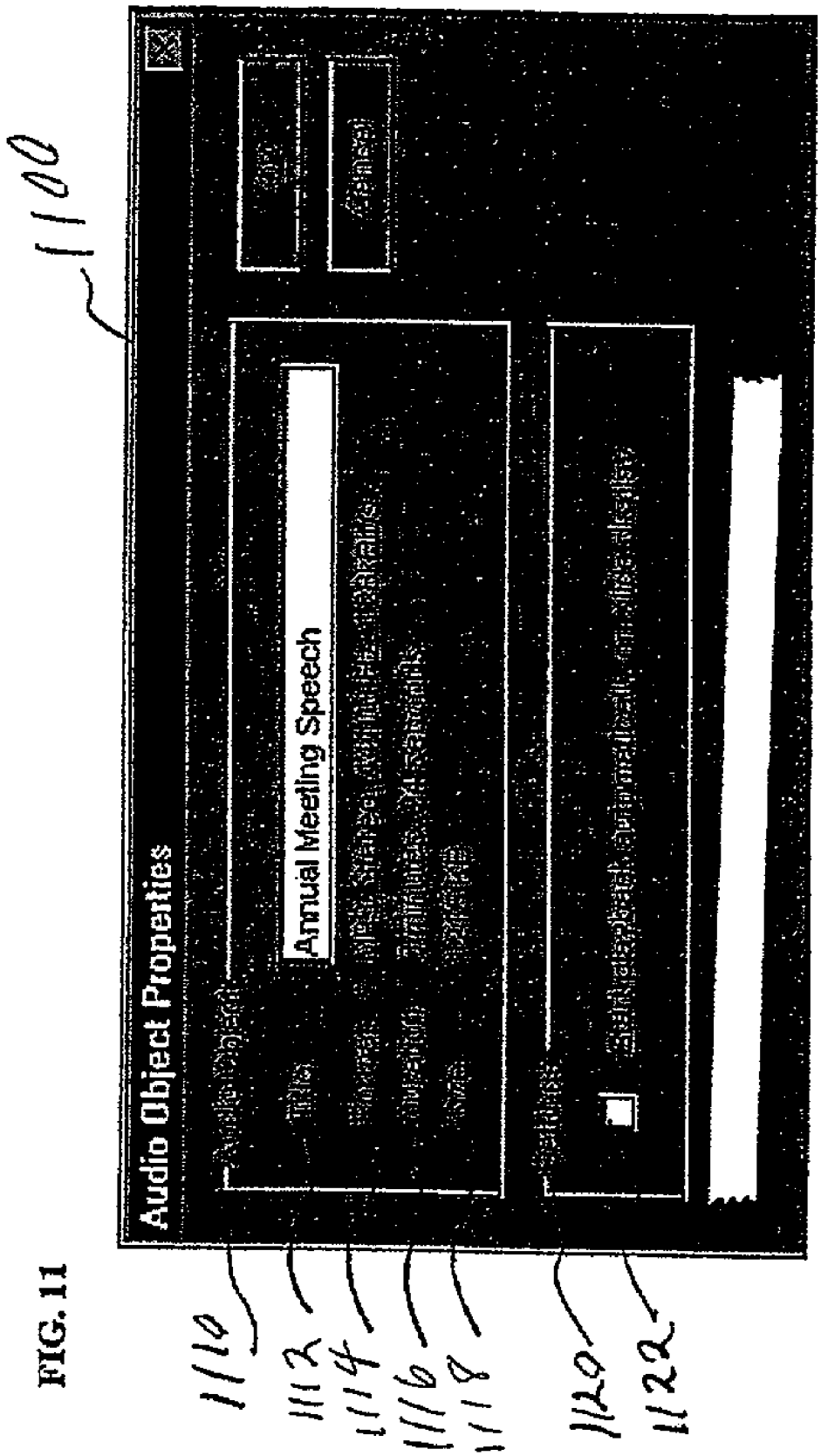
FIG. 11 illustrates a Audio Object Properties dialog box, in accordance with some embodiments of the invention.

After the user selects a valid media file and closes the File Open dialog box, the object is inserted into the presentation. At this time, an Audio Object Properties dialog box 1100 appears to allow the user to change any settings or properties for the newly inserted object. FIG. 11 illustrates an Audio Object Properties dialog box 1100 in accordance with some embodiments of the invention. Audio Object Properties dialog box 1100 includes audio object information 1110 and settings 1120. In addition to a title box 1112, the dialog box includes a format field 1114, which indicates the audio format of the object. Format field 1114 includes:

Type of audio format (e.g., AU, WAV, AIF, MP2 or MP3)
Mono or Stereo
Sampling rate (e.g., 44100 HZ)
Bit-rate (for MP3 or other applicable format) (e.g., 127 kBit/s)

After the user selects a valid file and closes dialog box 1100, insertion software 200 checks the user's system for the appropriate resources (e.g., component applications) used for playback of the audio object. In some embodiments, a media player is used for the playback of audio files. If a media player is not found insertion software 200 displays a message box on the screen, warning the user that although the media object is inserted into the presentation, the user is not able to play it back at that point.

When the user has completed editing object properties, the object appears in the PowerPoint® presentation. Manipulating audio objects is similar to manipulating meeting recording objects, except that Audio objects are not resizable (i.e., users cannot resize the object by grabbing its handles).

Figure 12:
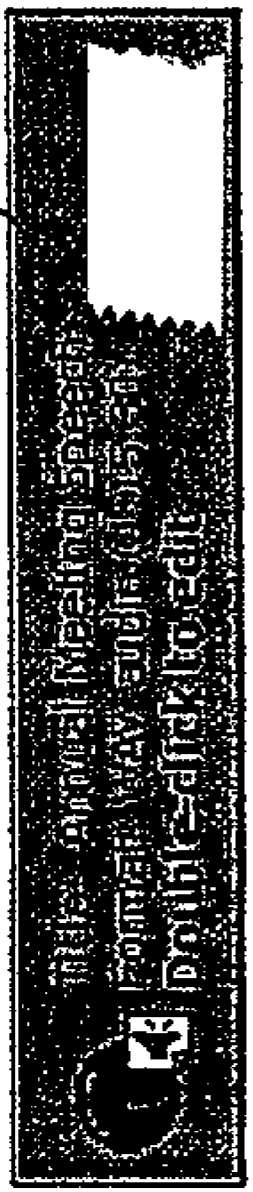
FIG. 12 illustrates an audio object as it would appear within a document, in accordance with some embodiments of the invention.

FIG. 12 illustrates an audio object 1200 as it would appear within a document, in accordance with some embodiments of the invention. In some embodiments, the entire object has a 3D outline. Audio object 1200 displays an information panel that consists of the elements listed in Table 4:

TABLE 4

| Element | Description |
| --- | --- |
| Audio object icon | Identifies that this is an Audio object. Left aligned to 15 pixels from the left edge of the object. |
| Information | Consists of Title, Format, and Instruction. Left aligned to 15 pixels from the right edge of the Audio object icon. |
| Title | The title of the audio object specified by the user in the Properties dialog box. |
| Format | Format: [TYPE] ([DURATION]) Where TYPE is one of the following: AIFF audio AU audio MP2 audio MP3 audio WAV audio and DURATION is the total duration of the audio clip. The format is: hh:mm:ss where hh is number of hours, mm is number of minutes, ss is number of seconds. |
| Instruction | Double-click to edit the object. |

Figure 13:
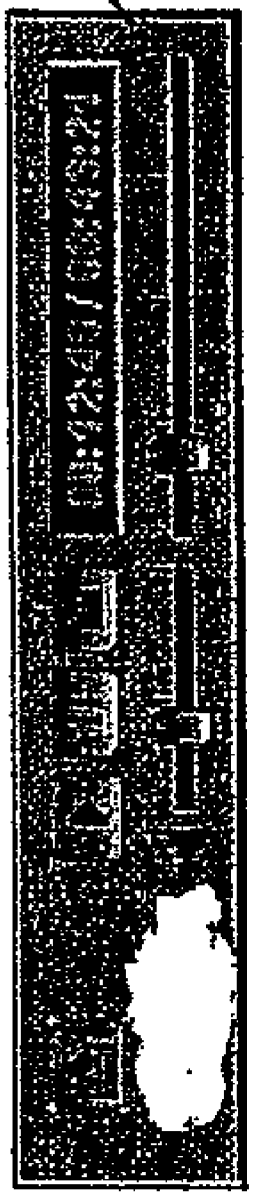
FIG. 13 illustrates an audio object in object editing mode, in accordance with some embodiments of the invention.

If the user selects (e.g., by double-clicking) the audio object, PowerPoint® switches to object editing mode, and FIG. 13 illustrates an audio object 1300 in object editing mode, in accordance with some embodiments of the invention. The appearance of audio object 1300 changes so that the definition of the user interface elements are the same as in the meeting recording object section, except that the audio object has no full-screen button.

In slide-show mode, if a user clicks the Properties button on the control panel, the Properties dialog box is illustrated, but the user may not edit properties.

An audio object may be viewed with viewer software 204 if the user opens or shares a presentation that contains that object. In some embodiments, for the host, the object behaves the same way as in slide-show mode, while for attendees, all controls are disabled except Properties, the volume slider, and mute. In the Properties dialog box, all options appear dimmed and may not be modified by the attendees.

When the user selects "Insert Video Object . . . " from either Insertion menu 500 or a toolbar, a standard File Open dialog box, similar to that illustrated in FIG. 6, appears on the screen. A video object may have one of the following extensions: .asf, .avi, .mov, .mpg, .gt.

After the user selects a valid file and closes the File Open dialog box, insertion software 200 checks the user's system for the appropriate resources (e.g., a component application) used for playback of the media. A media player is used for the playback of video files. If a media player is not found, insertion software 200 displays a message box on the screen, warning the user that although the media object is inserted into the presentation, the user is not able to play it back at that point.

Figure 14:
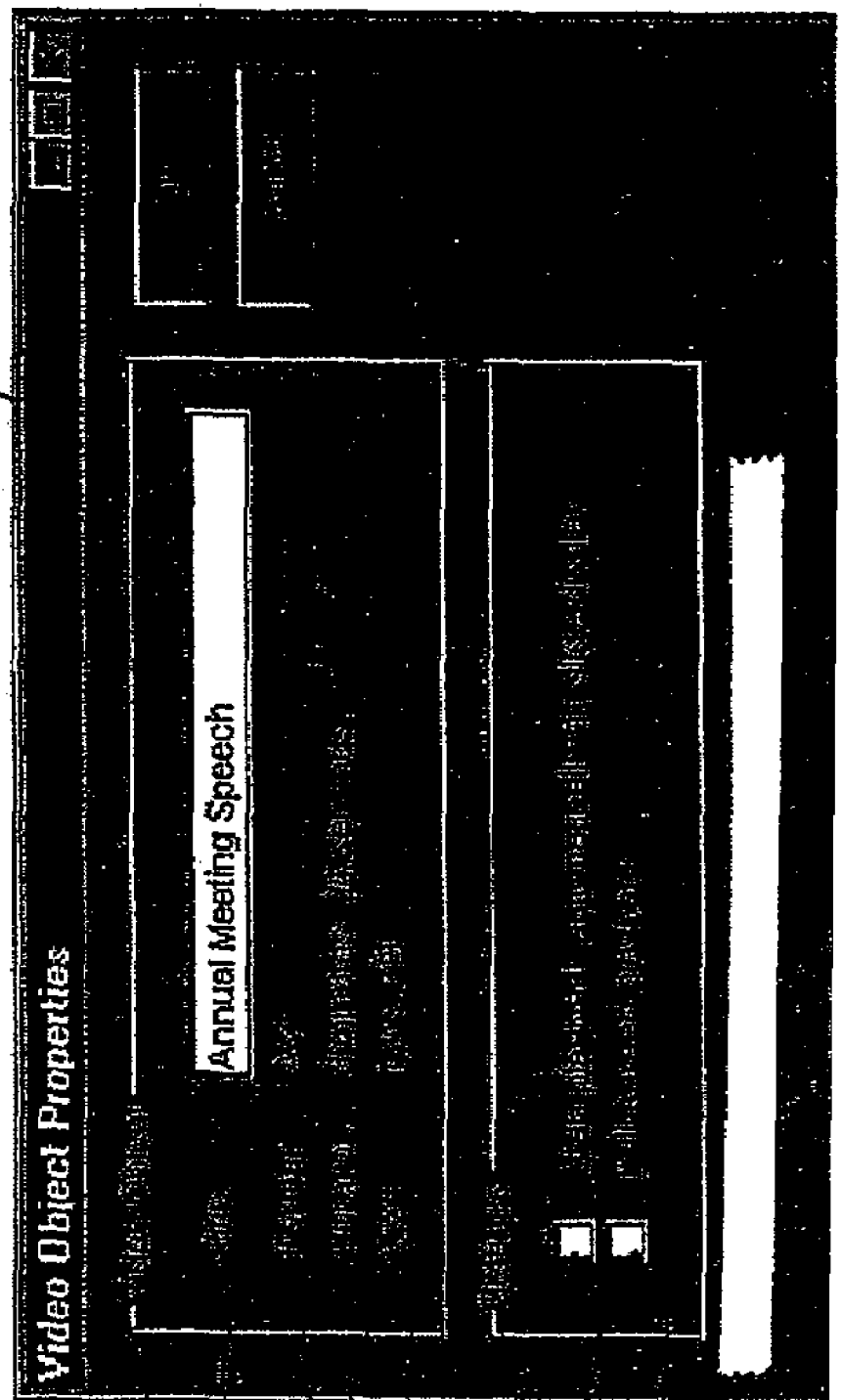
FIG. 14 illustrates a Video Object Properties dialog box, in accordance with some embodiments of the invention.

After the user has selected a valid media file and closed the dialog box, the object is inserted into the presentation. At this point, a Video Object Properties dialog box 1400 (FIG. 14) appears to allow the user to change any settings or properties for the newly inserted object.

The Video Object Properties dialog box 1400 includes object information 1410 and settings 1420. The object information 1410 includes a title box 1412, a format field 1414 (which indicates the audio format of the object), a duration field 1416, and a size field 1418. In some embodiments, the names listed in Table 5 are used for each of the video object types:

TABLE 5

| Extensions | Name |
| --- | --- |
| .asf | ASF video |
| .avi | AVI video |
| .mov | QuickTime video |
| .mpg | MPEG video |
| .qt | QuickTime video |

When the user has completed editing object properties, the object appears in the PowerPoint® presentation. Manipulation of a video object is similar to the manipulation of a meeting recording object, except that video objects stretch their content, rather than clipping the content.

Figure 15:
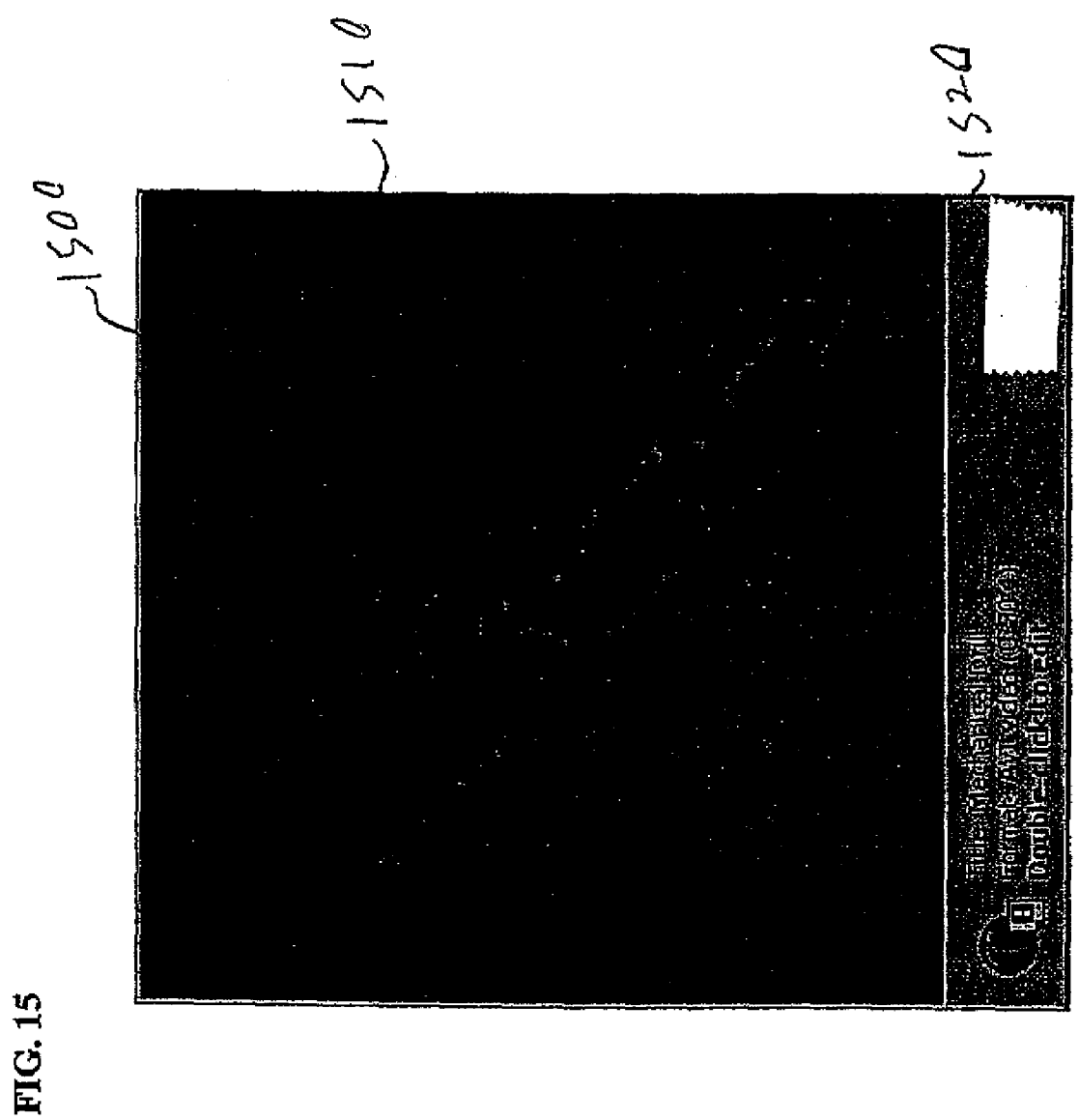
FIG. 15 illustrates a video object as it would appear in a document, in accordance with some embodiments of the invention.

FIG. 15 illustrates a video object 1500 as it would appear in a document, in accordance with some embodiments of the invention. In some embodiments, the object consists of two parts: upper part 1510 displays the content of the video, and lower information panel 1520 provides information about the video. Upper part 1510 displays a frame of the video in object editing mode. In some embodiments, the entire object and information panel 1520 may have a 3D outline. Information panel 1520 consists of the elements listed in Table 6:

TABLE 6

| Element | Description |
| --- | --- |
| Video object icon | Identifies that this is a Video object. Left aligned to 15 pixels from the left edge of the object. |
| Information | Consists of Title, Format, and Instruction. Left aligned to 15 pixels from the right edge of the Video object icon. |
| Title | The title of the video object specified by the user in the Properties dialog box. |
| Format | Format: [TYPE] ([DURATION]) Where TYPE is one of the following: ASF video AVI video QuickTime video MPEG Video and DURATION is the total duration of the video clip. |

TABLE 6-continued

| Element | Description |
| --- | --- |
| | The format is:<br>hh:mm:ss<br>where hh is number of hours, mm is number of minutes, ss is number of seconds. |
| Instruction | Double-click to edit the object. |

In some embodiments, the resize operation is constrained so that only proportional resize is allowed, and the initial size of the object is the same as the size defined in the video file. However, if the size of the object is larger than the size that the presentation allows, the size of the object is set to the maximum size allowed by the presentation.

Figure 16:
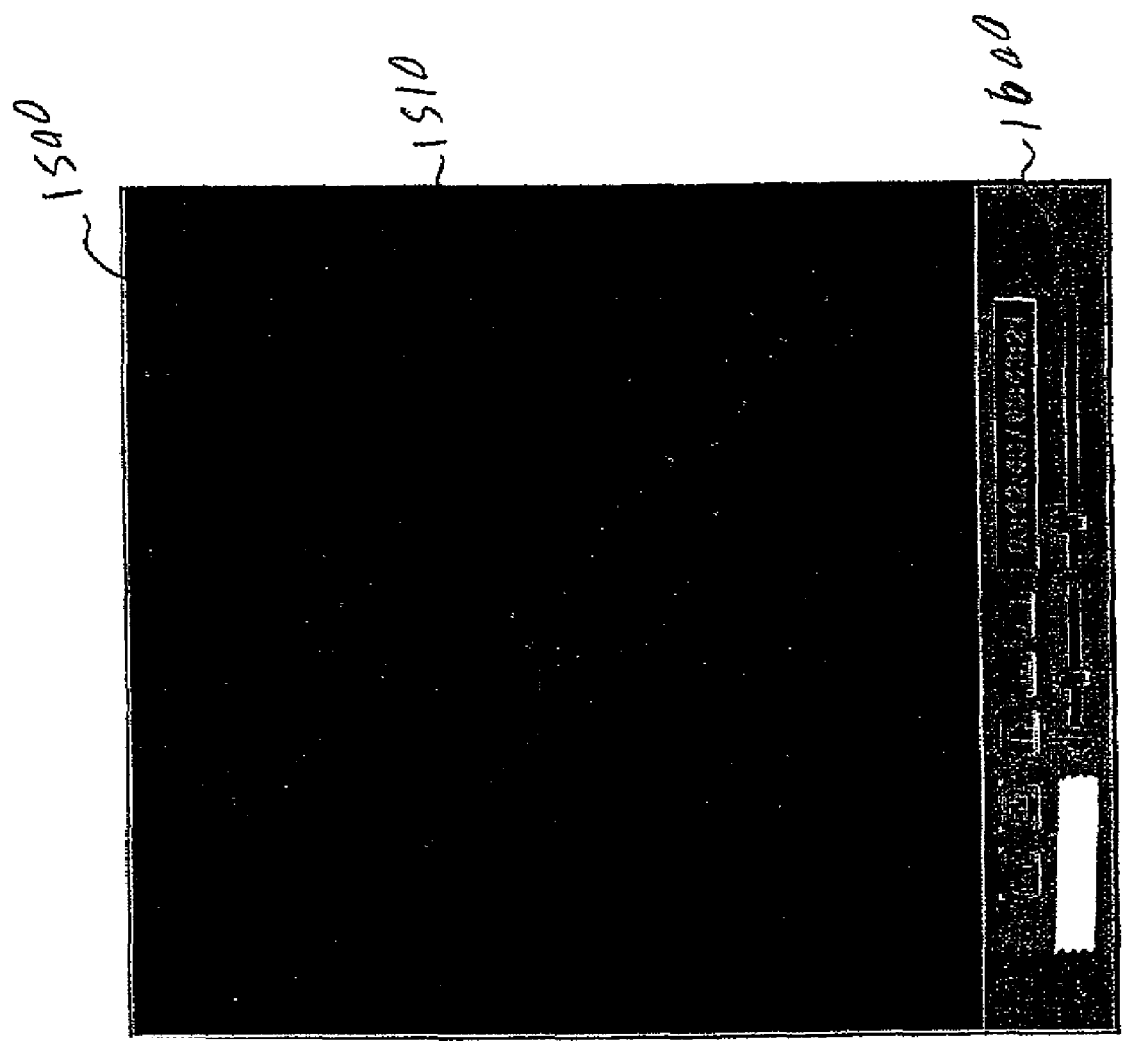
FIG. 16 illustrates a video object in object editing mode, in accordance with some embodiments of the invention.

FIG. 16 illustrates a video object 1500 in object editing mode, in which a control panel 1600 is displayed in accordance with some embodiments of the invention. If the user selects the video object (e.g., by double-clicking on the object), the PowerPoint® application switches to object editing mode. The definitions of the user interface elements are the same as in the meeting recording object section.

In slide-show mode, if a user clicks the Properties button on the control panel, the Properties dialog box is illustrated, but the user may not edit properties.

When the user clicks the Full-screen button on the control panel of the object, the object is displayed in full-screen mode. The control panel is not shown in this mode. In this mode, users can have maximum space for viewing the content. The following are the keyboard commands available in full-screen mode:

Ctrl-P:Play/Pause (toggle)
Enter:Play/Pause (toggle)
Ctrl-S:Stop
Esc:Quit full-screen mode In some embodiments, if the user does not have a media player installed, or for any reason the system has no video capability to play the video file, then the object is not played.

A video object may be viewed with viewer software 204 if the user opens or shares a presentation that contains that object. For the host, the video object behaves the same way as in slide-show mode. For attendees, all controls are disabled except Properties, the volume slider, and mute, and in the Properties dialog box, all options appear dimmed and may not be modified by the attendees.

When the user selects "Insert Flash Movie . . . " from either Insertion menu 500 or a toolbar, a standard File Open dialog box, similar to that illustrated in FIG. 6, appears on the screen. In some embodiments, a Flash™ movie may have a .swf extension. A Flash™ player is used for the playback of Flash™ movies. If a Flash™ player is not found, then insertion software 200 (FIG. 2A) displays a message box on the screen, warning the user that although the media object is inserted into the presentation, the user is not able to play it back at that point.

Figure 17:
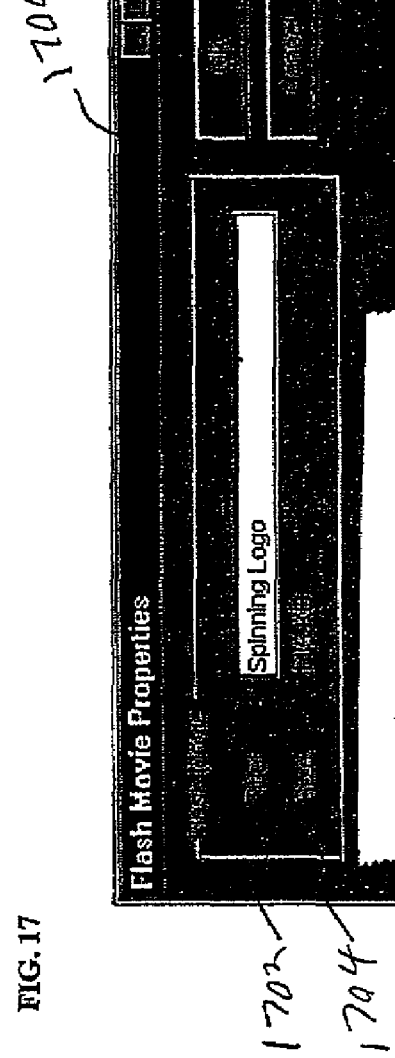
FIG. 17 illustrates a Flash Movie Properties dialog box, in accordance with some embodiments of the invention.

After the user has selects a valid media file and closes the File Open dialog box, the Flash™ movie object is inserted into the presentation. At this point, a Flash Movie Properties dialog box 1700 appears to allow the user to change any settings or properties for the newly inserted object (FIG. 17) in accordance with some embodiments of the invention. In particular, a user may edit a title box 1702 or view a size field 1704.

Figure 18:
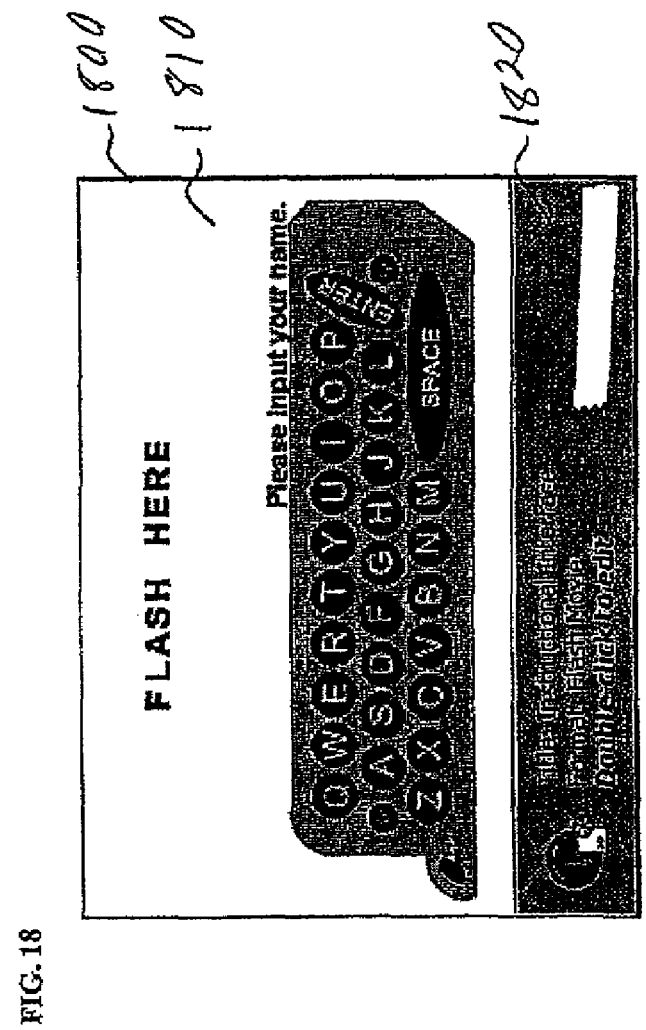
FIG. 18 illustrates a Flash™ movie object as it would appear in a document, in accordance with some embodiments of the invention.

When the user has completed editing object properties, the Flash™ movie object appears in the PowerPoint® presentation. Manipulation of a Flash™ movie object is analogous to manipulation of a meeting recording object, except that the Flash™ movie object stretches its content, rather than clipping the content. FIG. 18 illustrates a Flash™ movie object 1800 as it would appear in a document, in accordance with some embodiments of the invention.

The object consists of two parts: an upper part 1810 displays the content of the movie, and a lower information panel 1820 provides information about the movie. The upper part 1810 displays a frame of the movie in object editing mode. The entire object has a 3D outline, and lower information panel 1820 has a 3D outline. Lower information panel 1820 consists of the elements listed in Table 7:

TABLE 7

| Element | Description |
| --- | --- |
| Flash movie icon | Identifies that this is a Flash movie. Left aligned to 15 pixels from the left edge of the object. |
| Information | Consists of Title, Format, and Instruction. Left aligned to 15 pixels from the right edge of the Flash movie icon. |
| Title | The title of the flash movie specified by the user in the Properties dialog box. |
| Format | Format: Flash Movie |
| Instruction | Double-click to edit the object. |

Figure 19:
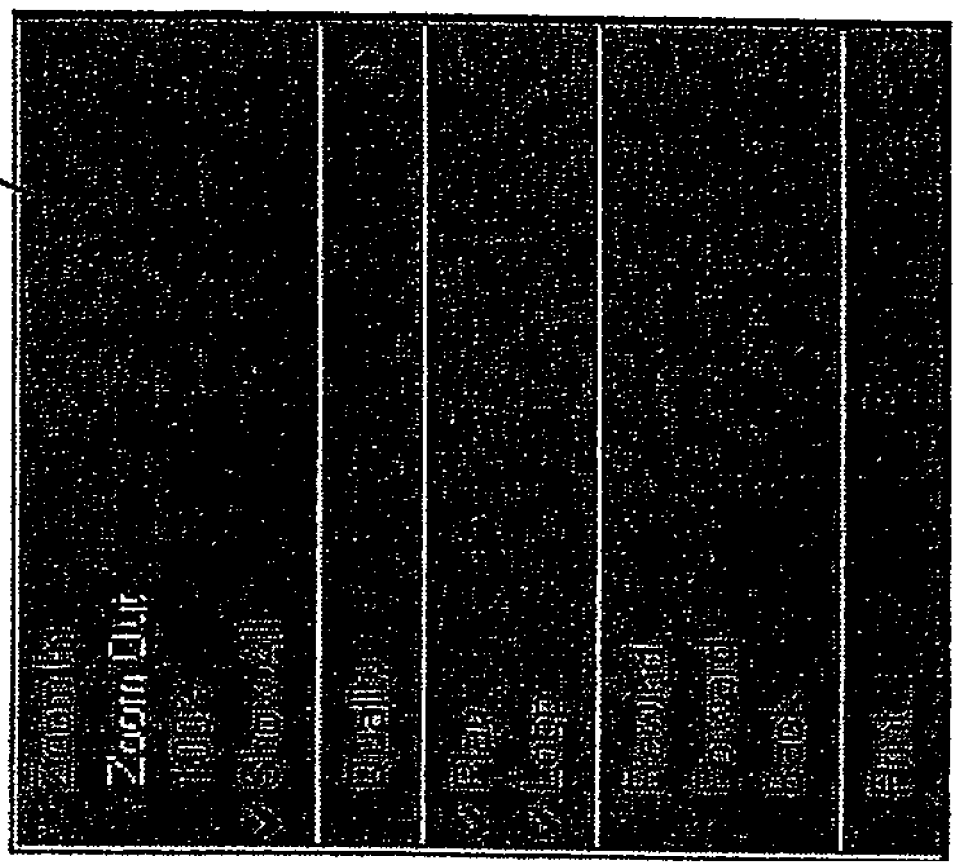
FIG. 19 illustrates a Flash™ movie object in object editing mode, in accordance with some embodiments of the invention.

As a Flash™ movie object has its own set of controls, it may not have the lower control panel that appears in other types of custom objects. In some embodiments, Flash™ movie objects are started automatically. FIG. 19 illustrates a Flash™ movie object in object editing mode in accordance with some embodiments of the invention. To control the playback of a Flash™ movie object, a user right clicks on the movie, and standard Flash™ context menu 1900 appears, in accordance with some embodiments of the invention.

A Flash™ movie object in slide show mode is the same as in object editing mode, except that if the user does not have a Flash™ player installed to play the movie, then the Flash™ movie object does not appear in slide show mode.

A Flash™ movie object may be rendered with viewer software 204 if the user opens or shares a presentation that contains that object. For a host, the object behaves the same way as in slide-show mode. For attendees, right clicking the Flash™ movie object does not reveal a context menu. If a Flash™ player is not installed on the user's computer to play the movie, then the object does not appear when the document containing the Flash™ movie object is viewed with viewer software 204.

Figure 6:
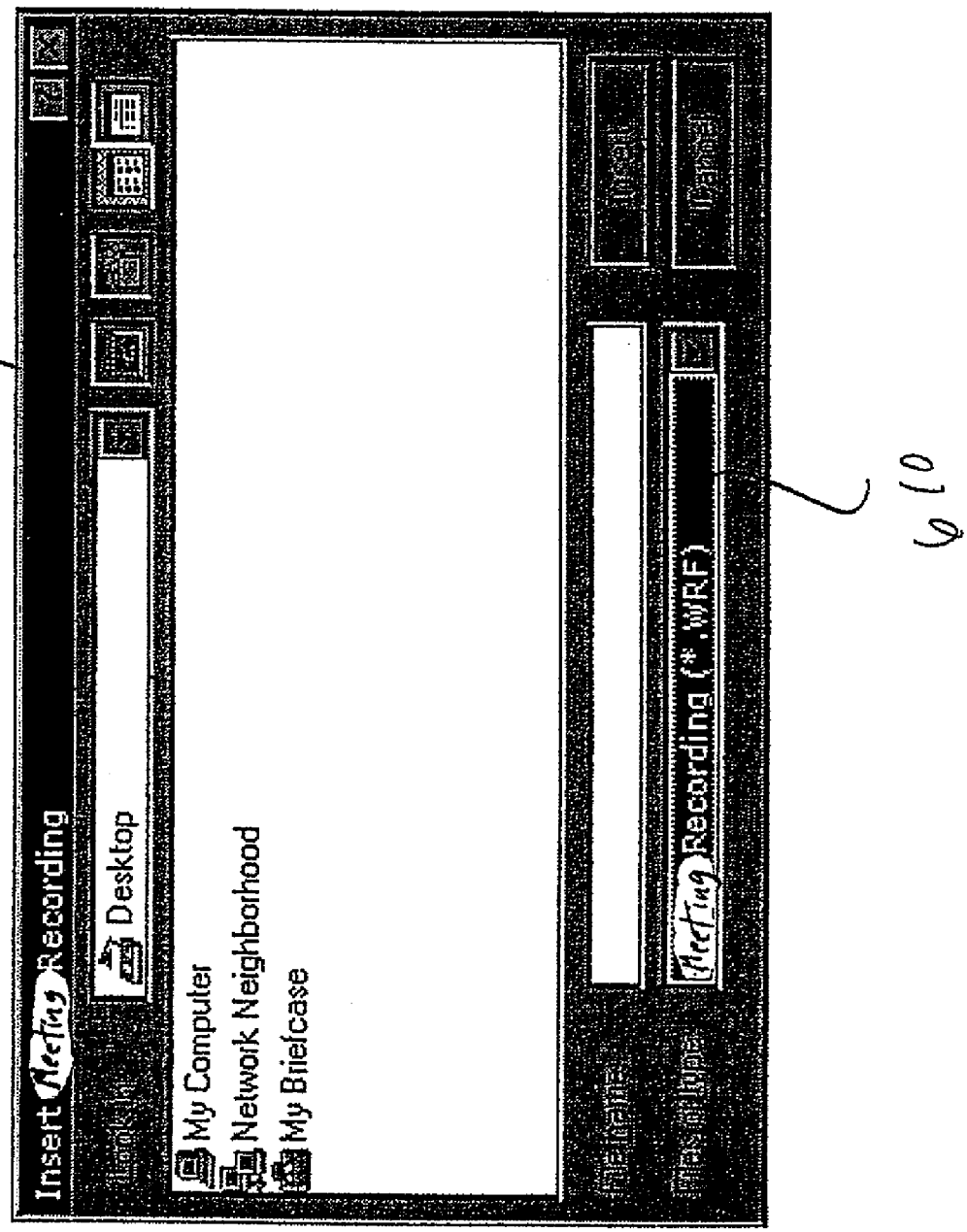
FIG. 6 illustrates an Insert Recording File Open dialog box, in accordance with some embodiments of the invention.

When the user selects "Insert 3D Model" from either Insertion menu 500 or a toolbar, a standard File Open dialog box, similar to that illustrated in FIG. 6, appears on the screen. In some embodiments, a 3D model object may have an .igs extension.

Figure 20:
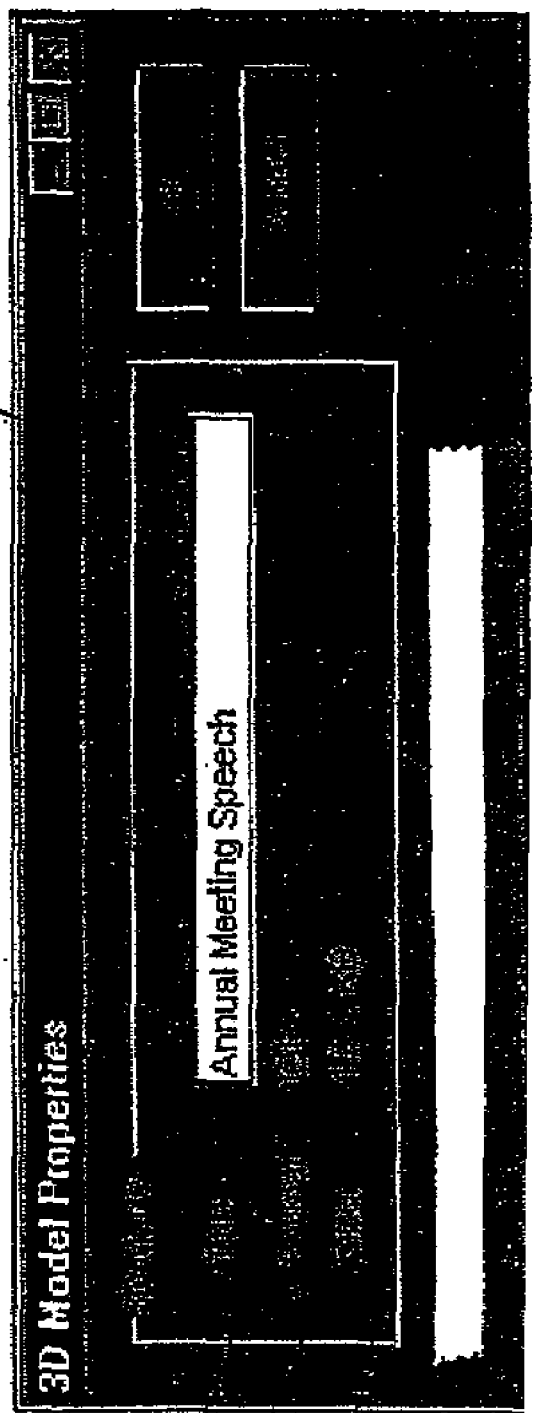
FIG. 20 illustrates a 3D Model Properties dialog box, in accordance with some embodiments of the invention.

After the user selects a valid media file and closes the File Open dialog box, the object is inserted into the presentation. At this point, a 3D Model Properties dialog box 2000 (FIG. 20) appears to allow the user to change any settings or properties for the newly inserted object. Dialog box 2000 includes a title box 2002, a format field 2004, and a size field 2006. Format field 2004 displays "IGES," which is a supported file format.

Figure 21:
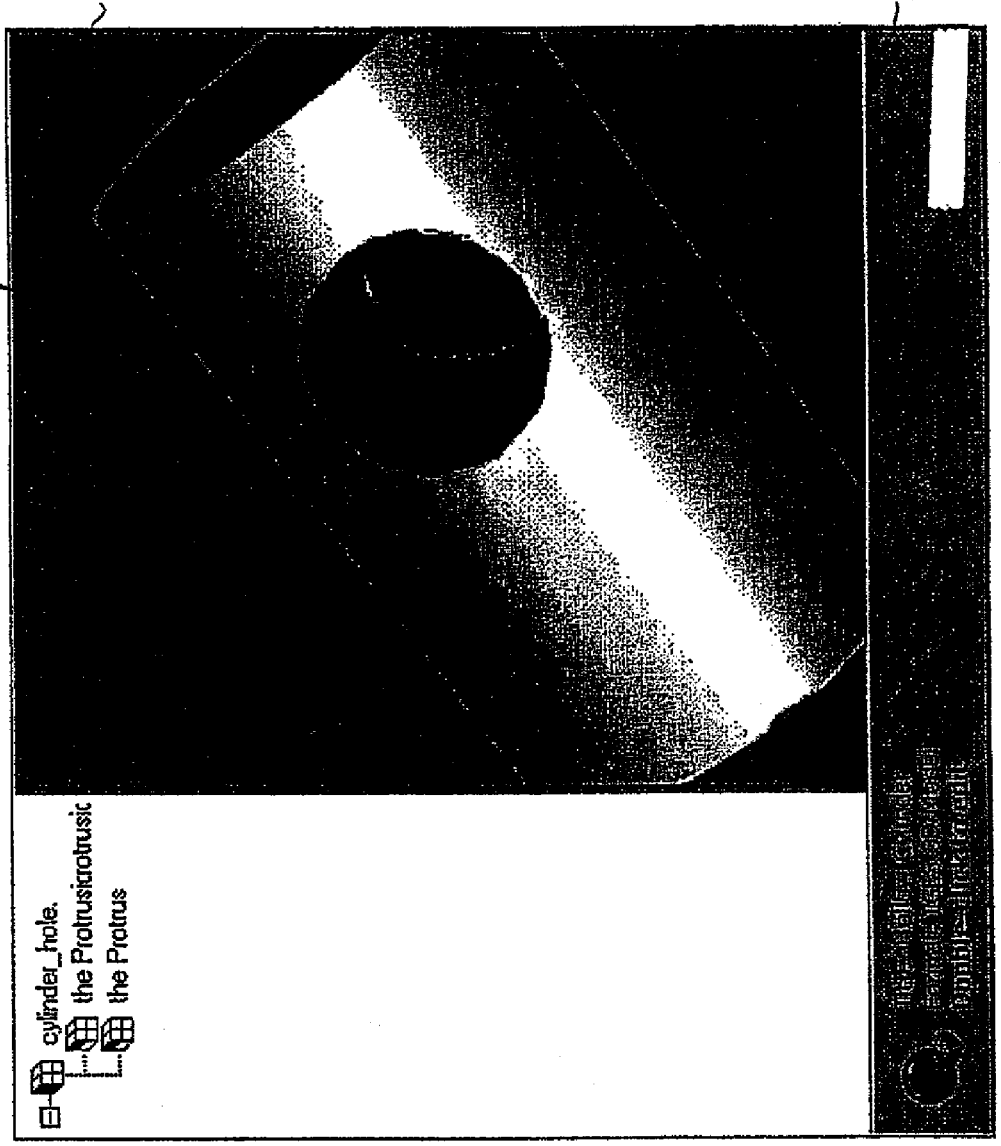
FIG. 21 illustrates a 3D model object as it would appear in a document, in accordance with some embodiments of the invention

When the user has completed editing object properties, the object appears in the PowerPoint® presentation. Manipulation of a 3D model object is similar to manipulation of a meeting recording object, except that a 3D model object stretches its content, rather than clipping the content. FIG. 21 illustrates a 3D model object 2100 as it would appear in a document, in accordance with some embodiments of the invention. The object consists of two parts: an upper part 2110 displays the content of the 3D model object, and a lower information panel 2120 provides information about the video. Upper part 2110 always displays the initial view of the model. The entire object has a 3D outline, and lower information 2120 panel has a 3D outline. Information panel 2120 consists of the elements listed in Table 8:

TABLE 8

| Element | Description |
| --- | --- |
| 3D Model icon | Identifies that this is a 3D model. Left aligned to 15 pixels from the left edge of the object. |
| Information | Consists of Title, Format, and Instruction. Left aligned to 15 pixels from the right edge of the Flash movie icon. |
| Title | The title of the 3D model specified by the user in the Properties dialog box. |
| Format | Format: IGES 3D Model |
| Instruction | Double-click to edit the object. |

Figure 22:
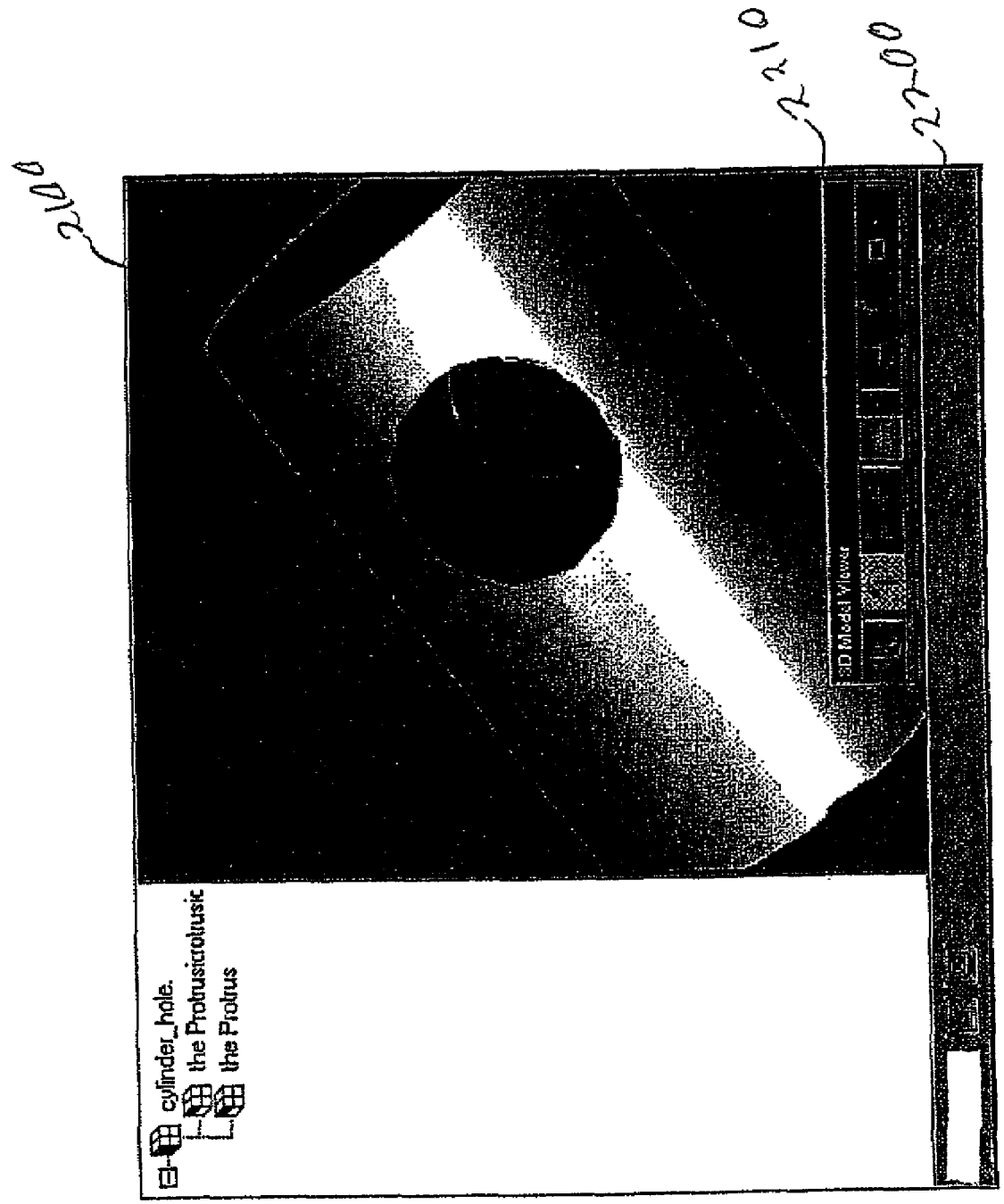
FIG. 22 illustrates a 3D model object in object editing mode, in accordance with some embodiments of the invention.

If the user selects (e.g., by double-clicking) the 3D model object, PowerPoint® switches to object editing mode. The appearance of the object in PowerPoint® changes in object editing mode, as is illustrated in FIG. 22, in accordance with some embodiments of the invention. The Properties and Full-screen buttons are displayed in control panel 2200. Floating 3D Model Viewer toolbar 2210 contains the tools used for manipulating the model itself.

In slide-show mode, if the user clicks the Properties button on the control panel, the Properties dialog box is displayed, but properties may not be edited.

When the user clicks the Full-screen button on the control panel of the object, the object is displayed in full-screen mode. The control panel is not present in this mode. In this mode, users can have maximum space for viewing the content. The following are the keyboard commands available in full-screen mode:

Ctrl-P:Play/Pause (toggle)
Enter:Play/Pause (toggle)
Ctrl-S:Stop
Esc:Quit full-screen mode A 3D model object may be viewed with viewer software 204 if the user opens or shares a presentation that contains that object. For a host, the object behaves the same way as in slide-show mode. For attendees, all controls are disabled, except the Properties button. In the Properties dialog box, all options appear dimmed and may not be modified by the attendees.

Viewer software 204 has native support for some of the embedded objects such as WRF and IGS (3D) files. When such objects are shown, viewer software 204 renders the files and provides the appropriate controls to manipulate the objects. In other cases, such as audio and video files, viewer software 204 invokes the appropriate component application such as a media player on the attendee's computer to play the embedded object on the attendee's screen.

After authoring the presentation, a user can click the Slide Show button, or select Slide Show from the View menu in PowerPoint® to view the final presentation. The presentation will be displayed full screen in slide show mode.

After a document with embedded custom objects is created, the document is converted to a Rich Multi-Media format before it is shared during an online meeting or viewed by a user independent of the meeting. The Rich Multi-Media format is a document format in accordance to some embodiments of the present invention that allows a document with embedded custom (e.g., media) objects to be viewed by a user other than the author of the document. In some embodiments, the Rich Multi-Media is applied to a Microsoft® PowerPoint® document. In other embodiments, the Rich Multi-Media format may be applied to other documents, such as Microsoft® & Word documents or Corel® WordPerfect® documents.

Figure 23:
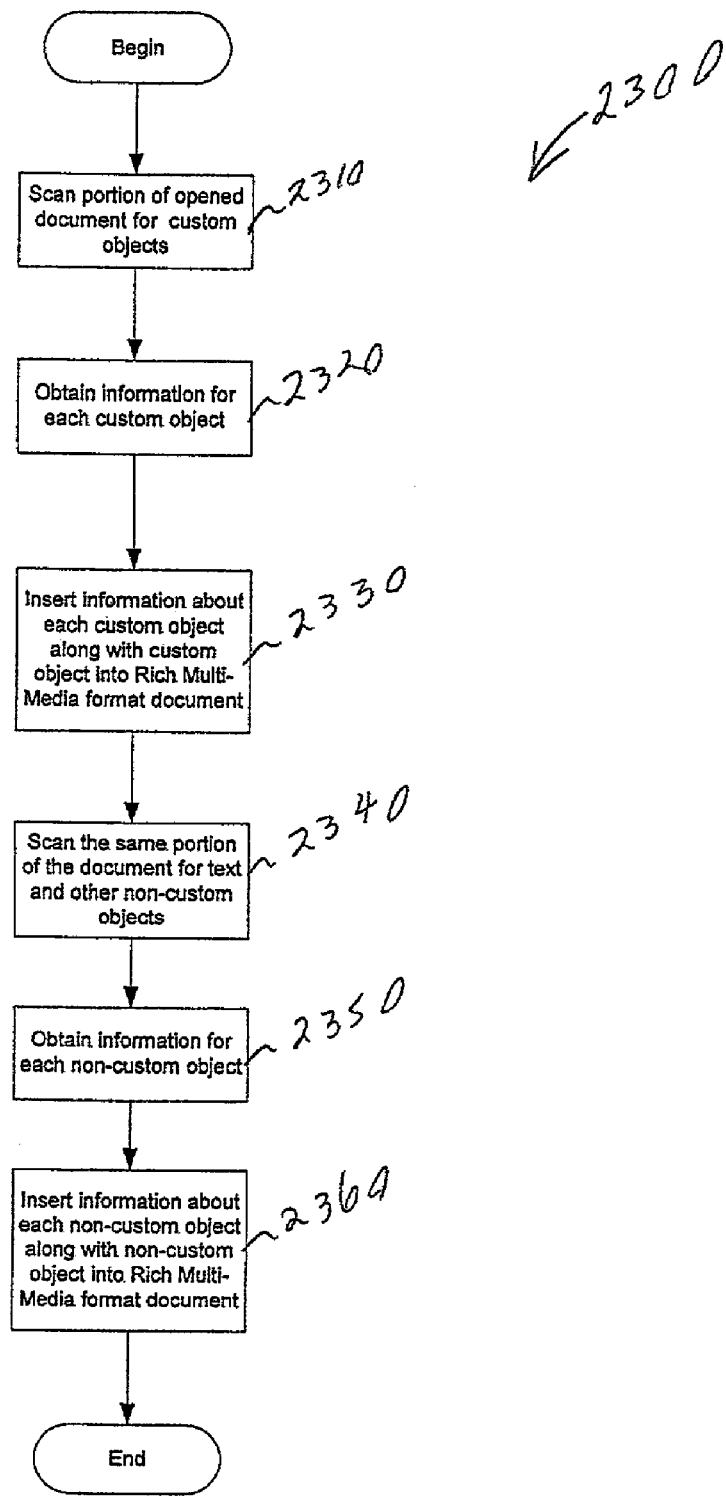
FIG. 23 is a flow diagram of an operation for converting a document containing embedded custom objects into a Rich Multi-Media format, in accordance with some embodiments of the invention.

FIG. 23 is a flow diagram 2300 of an operation for converting a document containing embedded custom objects into a Rich Multi-Media format, in accordance with some embodiments of the invention. The pdpptrd.cpp file submitted in Appendix A provides exemplary source code for converting a document to Rich Multi-Media format. The wpdfdoc.h file submitted in Appendix A defines the Rich Multi-Media format, and the wpdfobj.h file submitted in Appendix A includes class structures for objects used by the pdpptrd.cpp and wpdf.doc.h files.

A document that is converted to the Rich Multi-Media format may be sent to another user's computer (e.g., via e-mail or downloading) for viewing by that user.

After a document is opened by a presenter at presenter client computer 110 (stage 2310) conversion software 202 scans a portion of a document (e.g., a slide in a PowerPoint® presentation) for one or more custom objects. In stage 2320, conversion software 202 obtains information for each custom object. The information may include, for example, an object identifier and/or name for each custom object, the size of the custom object, the position of the custom object on the portion of the document, and the class type of the custom object. In some embodiments, each type of custom object has the same class structure (e.g., video objects have one class structure, while meeting recording objects have a different class structure).

In stage 2330, conversion software 202 inserts the information for each custom object followed by the custom object into a Rich Multi-Media format document. The custom objects may be embedded in the document or linked (e.g., via uniform resource locators (URLs) that point to the custom objects).

In stage 2340, conversion software 202 scans the same portion of the document (e.g., the same slide in a PowerPoint® presentation) for non-custom objects (e.g., text). In stage 2350, conversion software 202 obtains information for each non-custom object. The information may include, for example, the size of the non-custom object and the position of the non-custom object on the portion of the document. In stage 2360, conversion software 202 inserts the information for each non-custom object followed by the non-custom object into a Rich Multi-Media format document.

In some embodiments, when a document containing two custom objects and one non-custom objects is converted, the resulting Rich Multi-Media format document may have the following format:

<information about custom object><custom object>
<information about custom object><custom object>
<information about non-custom object><non-custom object>

When viewer software 204 renders the Rich Multi-Media format document, viewer software 204 uses the positional information about each object to place the object on a portion of a document. Viewer software 204 also renders the custom object itself or submits the custom object to a component application 208 for rendering. In some embodiments, the custom objects and non-custom objects are inserted into the Rich Multi-Media format document without modification.

The media playback in a Rich Multi-Media format document is an improvement over playing the media file on one computer and application-sharing it with attendees at other computers. With application-sharing, although one user may control playback of a media file with a media player application, attendees may see choppy video and may not hear the audio.

A Rich Multi-Media format document is also an improvement over streaming a media file from a server directly to an attendee by pushing a Uniform Resource Locator (URL). First, the media file may not be available on a server. Second, there is no control on the playback of the media file. Third, each attendee may have a different experience based on their network connection. Thus, the playback is not synchronized.

Viewer software 204 is able to render the document with embedded custom objects that is converted to Rich Multi-Media format during a meeting. Viewer software 204 synchronizes playback of the document with embedded custom objects across all client computers 110 and 120n.

Figure 24:
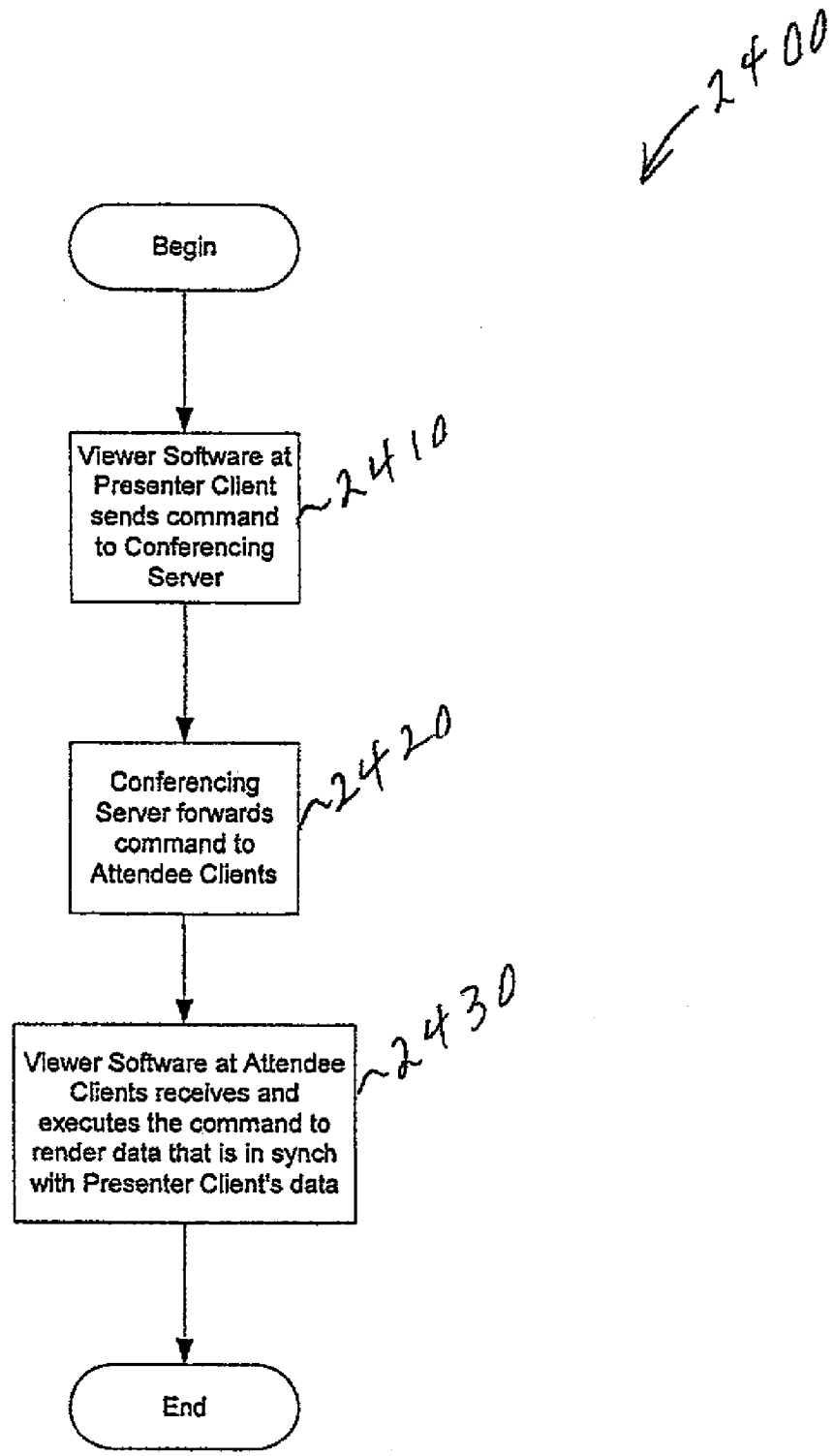
FIG. 24 is a flow diagram of operation for synchronizing sharing of a document between client computers at a meeting in a distributed collaborative computer system, in accordance with some embodiments of the invention.

FIG. 24 is a flow diagram of an operation 2400 for synchronizing sharing of a document between client computers 110 and 120n at a meeting in a distributed collaborative computer system 100, in accordance with some embodiments of the invention. In stage 2410, viewer software 204 at a presenter client computer 110 sends a command to conferencing server 140. The command identifies the data to be rendered at each attendee client computer 120n. For example, the command might indicate that a video, which is currently playing at each client computer 110 and 120n, is to be paused. In stage 2420, conferencing server 140 forwards the command to the attendee client computers 120n. In stage 2440, viewer software 204 at each attendee client computer 120n receives and executes the command to render data that is in synch with presenter client computer's 110 data. Thus, the presenter and the attendees receive (e.g., view or hear) the same data at the same time.

Figure 25:
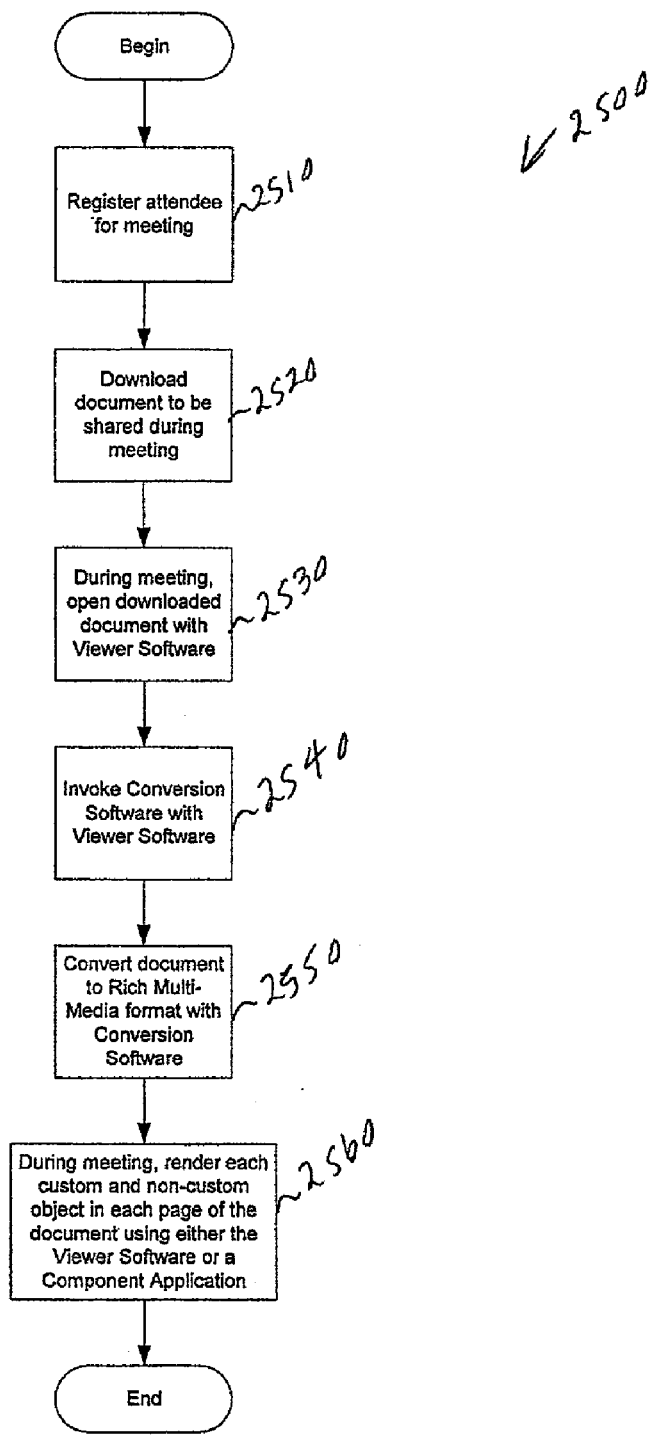
FIG. 25 is a flow diagram of operation for rendering data at an attendee client computer at a meeting in a distributed collaborative computer system, in accordance with some embodiments of the invention.

Before an attendee client computer 120n participates in a meeting, the attendee registers for the meeting by, for example, accessing a web site hosted by conferencing server 140 and submitting information on the meeting the attendee wishes to attend. FIG. 25 is a flow diagram of an operation 2500 for rendering data at an attendee client computer 120n at a meeting in a distributed collaborative computer system 100, in accordance with some embodiments of the invention. In stage 2510, attendee client computer 120n is registered for a particular meeting that is to occur at a particular date and time (e.g., a Business Development meeting to take place on Feb. 22, 2002 from 3:00 p.m. to 4:00 p.m.). Then, when presenter client computer 110 starts the meeting, commands from presenter client computer 110 are routed to attendee A client computer 120n via conferencing server 140. After an attendee is registered, a document with embedded custom objects to be shared during the meeting is downloaded to the attendee A client computer 120n (stage 2520). In some embodiments, multiple documents may be downloaded.

In stage 2530, during the meeting, viewer software 204 opens the downloaded document. Viewer software 204 invokes conversion software 202 in stage 2540. Next, conversion software 202 converts the document to a Rich Multi-Media format in stage 2550. During the meeting, as presenter client computer 110 selects a portion (e.g., a page) of the document for rendering, viewer software 204 at attendee client computer 120n renders each custom and non-custom object, and, in some cases, viewer software 204 invokes a component application to render an object (stage 2560).

In some embodiments, rather than downloading one or more documents when an attendee registers, the documents may be downloaded when the meeting is about to being or at a time scheduled by the attendee. In some embodiments, the downloaded documents include embedded objects, and, in other embodiments, the downloaded documents include links (e.g., uniform resource locators (URLs)) to objects. If a URL is downloaded, viewer software 204 at an attendee client computer 120n retrieves the file associated with the URL from, for example, streaming server 150.

When the object is downloaded to the attendee as a page of the document before it is to be played, then, when that page of the document is to be played, the media player on the attendee's computer is invoked by viewer software 204 to play the embedded object in the document. This leads to a smooth playback without any network latency, and the attendees hear the audio portion and/or view images in synch with each other and the presenter.

In some embodiments, the component application (e.g., media player) appears to be embedded in viewer software 204 (e.g., using ActiveX controls or application programming interfaces (APIs)). Presenter client computer 110 has player controls, such as pause, fast-forward, and rewind (e.g., the controls in control panel 1000 in FIG. 10). The component application available on the attendee's computer will appear on the attendee's screen and may be different than the one used by the presenter. Although the media is being played on each attendee's computer, the presenter controls the playback. For example, when the presenter pauses or rewinds a video, each attendee's component application will perform the same operation, even if attendee client computer 120n is using a different component application to play the video. In other words, all the attendees will have a near synchronized experience irrespective of their network connection.

Viewer software 204 allows users to view multiple documents or other types of information. Viewer software 204 renders all static documents, PowerPoint® transitions, 3D files (e.g., in IGS format), and Meeting Recording files (i.e., WRF files). Viewer software 204 contains controls to manipulate 3D objects when an IGS file is being viewed. Viewer software 204 contains WRF player controls when a WRF file is encountered.

Figure 26:
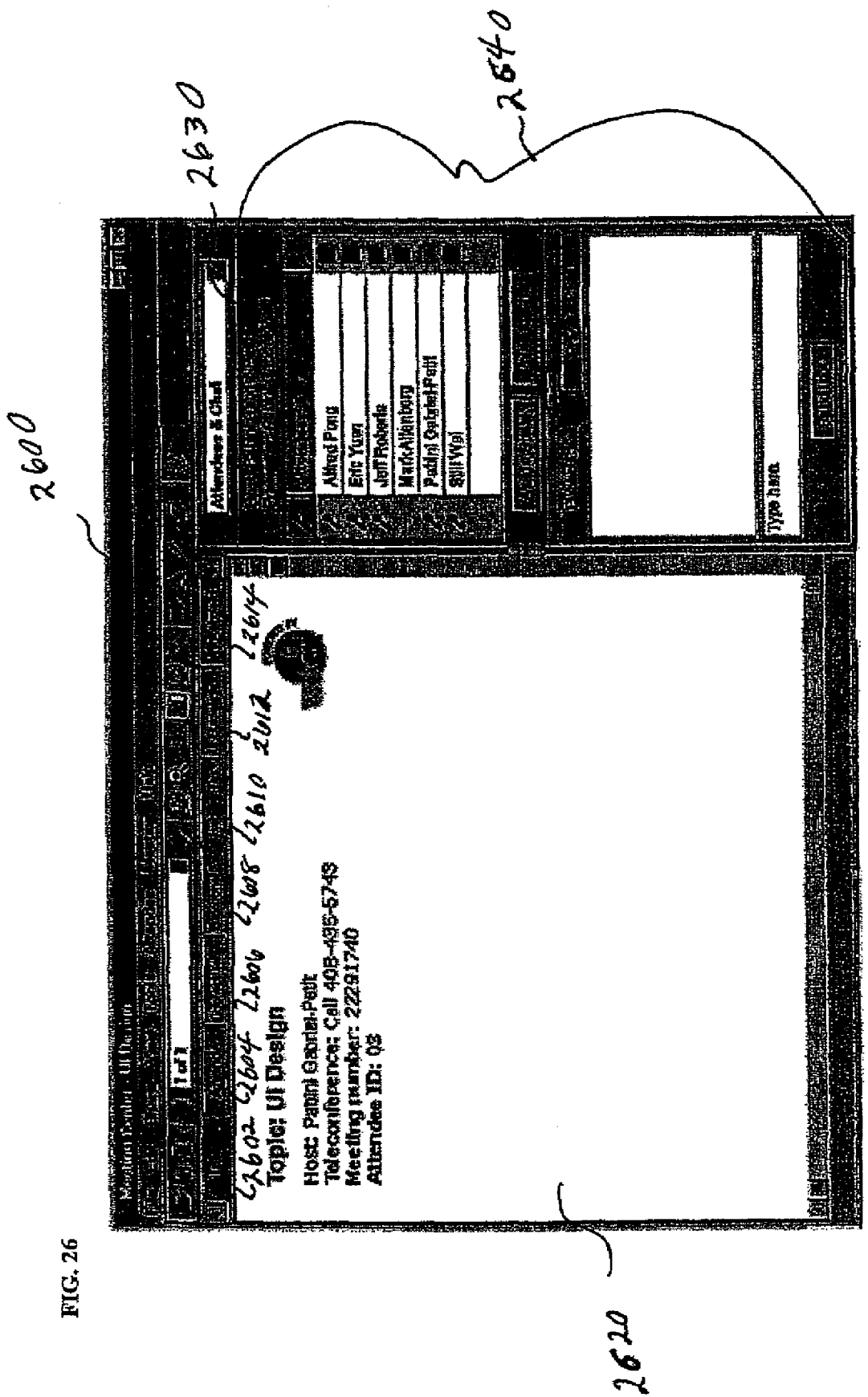
FIG. 26 illustrates a user interface for a Meeting Center window, in accordance with some embodiments of the invention.

In some embodiments, the following media players are supported by viewer software 204:

Windows® media player
Real® media player
QuickTime® media player
Shockwave™ player/Flash™ player Insertion software 200 allows a presenter to prepare shared content (e.g. a document, presentation, or other type of content) for viewing in advance of a meeting. Viewer software 204 allows a host or a presenter to start a meeting. Viewer software 204 provides features that let users easily navigate the pages of a document and provides a thumbnail view of shared content items. Viewer software 204 allows users to easily control the layout of Meeting Center window 2600, which is a user interface provided by the invention during an on-line meeting and which is illustrated in FIG. 26. Viewer software 204 improves the usability and usefulness of the toolbar and palettes, thumbnail view, full-screen view, and attendee privileges. Viewer software 204 allows a presenter to open or share multiple documents, either before or during a meeting. In some embodiments, a palette is a small window that floats on top of a Meeting Center window 2600 and the Attendees & Chat panel, and contains assorted drawing tools or annotation colors.

In some embodiments, a user interface is provided in which different information are illustrated as if they were on separate tabs. FIG. 26 illustrates a user interface for a Meeting Center window 2600, in accordance with some embodiments of the invention. For example, an Info tab 2602 displays information about a meeting. An Agenda tab 2604 appears if a host provides an agenda when scheduling a meeting, and the Agenda tab contains the agenda for the meeting. One or more Shared Content tabs 2606, 2608, 2610, and 2612 (sometimes referred to as Viewer tabs) appear for each document, presentation, or other type of content that a presenter shares. A Whiteboard tab 2614 appears if a presenter shares a whiteboard. A Fax tab appears if a host or presenter receives or opens a fax. One or more of these tabs may be optional (e.g., the agenda, whiteboard, and fax tabs).

A Next Tab button may be provided that appears to the right of the Shared Content tabs (e.g., if there are more tabs than can appear in the window at one time), and selecting this button causes the next tab to scroll into view. A Previous Tab button contains a left-pointing arrow and appears to the left of the Shared Content tabs (e.g., if there are more tabs than can appear on the screen at one time). If a user has previously clicked the Next Tab button, clicking the Previous Tab button causes the previous tab to scroll into view. In full-screen view, Meeting Center window 2600 and task bar disappear, and the shared content is visible.

In some embodiments, a host schedules a meeting to be presented by a presenter. When scheduling a meeting, the host can designate the primary presenter for the meeting. The host may also start and end a meeting, control attendee privileges and access to a meeting and teleconference, and designate a primary and/or current presenter (i.e., there may be multiple hosts and/or presenters during a single meeting).

A presenter provides information to other meeting attendees; can share documents, presentations, applications, Web browsers, the computer's desktop, or information on a whiteboard with other attendees; and can take a poll. Initially, the meeting host is also the presenter. The host can designate any user attending the meeting (e.g., the host, the presenter at presenter client computer 110, or a user at an attendee client computer 120*n*) as the current presenter. A presenter may or may not be an authorized user, and a primary presenter may or may not be an authorized user. An authorized user is one who has an account on conferencing server 140 and uses his or her user name and password to log in to a Meeting Center on conferencing server 140.

In advance of the meeting, the primary presenter may prepare content for viewing in Meeting Center window 2600 by creating a new document or by editing an existing one. The presenter may share the document by opening existing content that has already been converted to Rich Multi-Media format or by sharing new content. The content appears on the Shared Content tabs in the content viewer. When a presenter shares a document, presentation, or whiteboard, it appears in content viewer 2620 (e.g., a content area on the left side of Meeting Center window 2600).

The primary presenter for a meeting can click a Prepare button to view and work in Meeting Center window 2600 without starting the meeting. Thus, in advance of a meeting, a presenter can open or share all of the documents or other content to be presented during the meeting.

An attendee is a user who views the information that a presenter shares, including documents, presentations, applications, Web browsers, the presenter's desktop, and information on a whiteboard. An attendee can annotate shared information, and participate in a chat or poll. An attendee may or may not be an authorized user.

The panels are groups of controls that reside in the area of Meeting Center window 2600. A Panel drop-down list box 2630 is used to select a panel. Selecting a panel in Panel drop-down list box 2630 displays the panel in the area on the right of Meeting Center window 2600. The panels include, for example: an Attendees & Chat panel 2640 (which is selected in FIG. 26), a Polling panel, and a Video panel. Meeting Center window 2600 provides a floating Attendees and Chat panel 2640. In some embodiments, Attendees and Chat panel 2640 and the Video panel are separate panels. For example, the Video panel may be part of Meeting Center window 2600 itself, while Attendees and Chat panel 2640 may not be integrated into Meeting Center window 2600.

In some embodiments, Meeting Center window 2600 is in conformance with Microsoft® user interface standards. For example, the window is in the standard gray, the toolbar appears at the standard location, below the menu bar, the behaviors of the toolbar buttons and palettes are consistent and conform to standards, and the appearance of the tabs is consistent with standards. Additionally, to achieve greater visual consistency, wherever possible, the layout of user interface elements conforms to a grid.

In Meeting Center window 2600, shown in FIG. 26, a control bar with a handle separates the panels and the content viewer. Dragging the panel size control lets a user resize these areas of the window, and control the relative proportions of the panels and the content viewer. Also, the window may be resized using, for example, a standard size grip that is displayed when a user places a mouse at a corner of Meeting Center window 2600.

Viewer software 204 includes several commands, including a Close command, a Save All Content command, a Start Meeting command, Reorder Viewer Tabs command, a Thumbnails command, a Panels command, and a Synchronize My Display command. These commands may appear as menu items in Meeting Center window's 2600 menu bar.

In some embodiments, the Close command is available for hosts and presenters only. Choosing this command closes the document on the tab that is currently visible in the content viewer. The Save All Content command allows the host or primary presenter for a meeting to prepare the information that is to be presented in advance of the meeting and save the content on conferencing server 140. In some embodiments, this command is available for hosts and the primary presenter for a meeting. Choosing this command saves all of the content that a presenter has opened or shared when preparing for a meeting. When the meeting starts, all of the saved content automatically appears in the content viewer.

The Start Meeting command toggles with the End Meeting command. This command is available for hosts in some embodiments of the invention. The Start Meeting command allows a host to start a meeting, for example: (1) If the primary presenter is currently preparing content for viewing in the meeting; or (2) If one or more attendees join a meeting before the presenter has started the meeting. In some embodiments, the meeting starts automatically when the first attendee joins the meeting.

In either circumstance, when Meeting Center window 2600 for a meeting is already open, the host needs a mechanism for easily assuming control of the meeting, without disrupting the activities of the primary presenter or those attendees who are already in the meeting. The host can assume control of the meeting by choosing the Start Meeting command.

The "Reorder Viewer Tabs . . . " command is available for hosts and presenters in some embodiments. Choosing this command displays the Reorder Viewer Tabs dialog box, in which a host or presenter may modify the order in which documents or other content appear on the Shared Content tabs.

Figure 27:
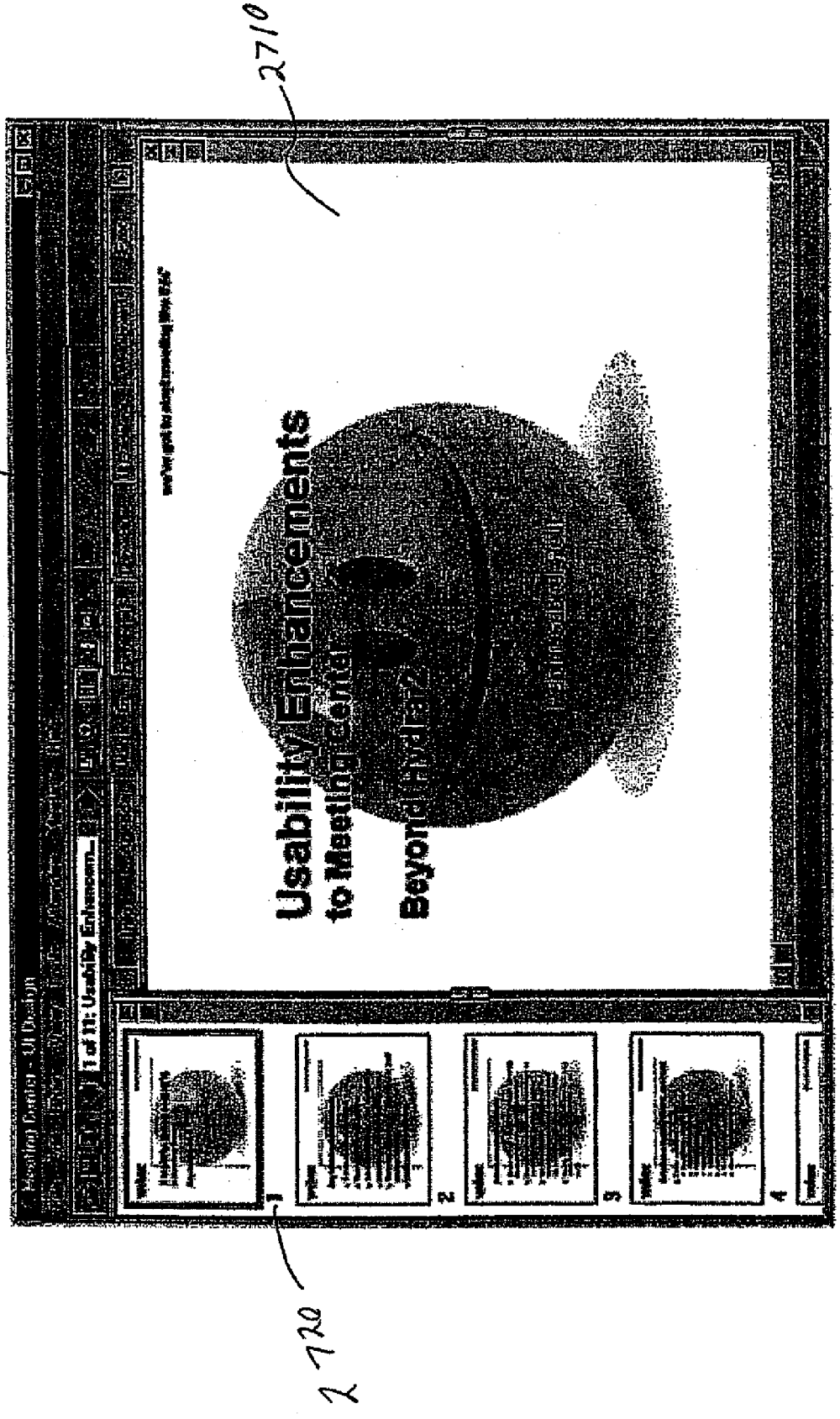
FIG. 27 illustrates a content viewer and thumbnails, in accordance with some embodiments of the invention.

The Thumbnails command is a toggle command that is available to the host and presenter in some embodiments, and the attendee privilege settings determine whether this command is available to attendees. Choosing this command displays the thumbnail viewer to the left of the content viewer, which allows a user to navigate the slides of a presentation or the pages of a document. A thumbnail viewer is an area that a user can display on the left side of Meeting Center window 2600 and that contains miniature images ("thumbnails") of each page in a shared document. FIG. 27 illustrates a content viewer 2710 and thumbnails 2720, in accordance with some embodiments of the invention.

The Panels toggle command is available to all users. By default the Panels command is selected, and the panels appear in Meeting Center window 2600. Choosing the Panels command closes the panels, and choosing this command again displays the panels to the right of content viewer 2620.

The Synchronize My Display command is available to hosts and presenters, and the attendee privilege settings determine whether this command is available to attendees in some embodiments. If a user (e.g., host or attendee) is viewing a slide or page in the content viewer 2620 other than that which the presenter is currently displaying, choosing this command synchronizes the user's display with that of the presenter.

In some embodiments, any user (e.g., host, presenter, or attendee) can annotate, save, open, or print an entire document. Other users may include, for example, system administrators.

Table 9 provides detailed information about the buttons and other controls on the toolbar. In Table 9, toggle buttons are noted as such, and all other buttons are action buttons.

TABLE 9

| Button ToolTip | Function |
| --- | --- |
| Open | Opens a presentation or document. |
| Save | Saves a presentation or document. |
| Share Presentation or Document | Allows a host or presenter to share a presentation or document with other attendees. |
| Previous Slide | Displays the previous slide of a presentation or page of a document in the content viewer. |
| Go To dropdown combo box | Allows a user to select a slide or page for viewing in the content viewer. |
| Next Slide | Displays the next slide of a presentation or page of a document in the content viewer. |
| Full-Screen View/Content Viewer | This toggle button has the same function as the Full Screen command. |
| Zoom In/Zoom Out | Allows a user to click this toggle button to enter and exit zoom mode. In zoom mode, when the button is in its down state, the pointer changes to a magnifying glass, and a user can repeatedly click the content viewer to zoom in or out by the percentages listed in the Zoom In/Zoom Out drop-down menu. |
| Zoom In/Zoom Out drop-down menu | Allows a user to choose a command on this menu to control the magnification of the document in the content viewer. |
| View Thumbnails | This toggle button has the same function as the Thumbnails command. |
| View Panels | This toggle button has the same function and the Panels command. |
| For hosts and presenters: Synchronize Displays | For a host or presenter, this button allows the host or presenter to synchronize all displays of all attendees. For attendees, this function synchronizes the attendee with the presenter's display. |
| For Attendees: Synchronize My Display | |
| Laser Pointer | A presenter can click this toggle button to enter and exit a laser pointer mode that lets the presenter dynamically point to elements on a page or slide in the content viewer or full-screen view. In this laser pointer mode, when the button is in its down state, the pointer changes to a laser beam, with which the presenter can point to elements on a page. If the presenter points to an element on a page that is not currently visible in a participant's content viewer of full-screen view, the page automatically pans to bring the content in that sector fully into view. For example: If the presenter points to an element in a corner sector of a page that is currently off-screen, the page pans to bring the entire corner into view. If the presenter points to an element in the top or bottom middle sector of a page, the page pans to bring the entire sector into view. |
| Pointer Tool | A user can click this toggle button to enter and exit an annotation mode that lets the user insert a point annotation—that is, an arrow with the user's name on it—on a document in the content viewer. In this pointer annotation mode, when the button is in its down state, the pointer changes to an arrow, and a user can click the content viewer to insert one or more pointer annotations. |
| Text Tool | A user can click this toggle button to enter and exit an annotation mode that lets the user type text annotations on a document in the content viewer. In this text annotation mode, when the button is in its down state, the pointer changes to an I-beam, and a user can click the content viewer to select an insertion point, and type one or more annotations. |
| Highlighter Tool or other drawing tool | The drawing tool is a toggle button that depends on the drawing tool that is currently selected on the Drawing Tools palette. The Highlighter Tool is the default button. A user can click this toggle button to enter and exit an annotation mode that lets the user draw annotations, using various tools, on a document in the content viewer. In this drawing annotation mode, when the button is in its down state, the pointer changes according to the tool that is currently selected, and a user can draw one or more annotations. |
| Drawing Tools palette | A user can select a drawing tool on this palette. |
| Eraser Tool | A user can click this toggle button to enter and exit eraser mode. In eraser mode, when the button is in its down state, the pointer changes to an eraser, and a user can click an annotation in the content viewer to erase it. |
| Eraser Tool drop-down menu | A user can choose a command on this menu to erase one or more pointers, or all pointers or annotations. |
| Annotation Color | A user can click this toggle button to display the Annotation Color palette at the location where the user last left it. |
| Annotation Color drop-down palette | A user can choose a color on this palette. All types of annotations that the user makes appear in this color. |

The pointer annotation may be represented with an arrow that may include the annotator's identifier (e.g., name). A pointer annotation that has no name on it is for use by a presenter. If attendees do not have the annotation privilege, there is no need to display a presenter's name on a pointer annotation to distinguish it from an attendee's pointer. The length of a pointer annotation is variable and depends on the length of, for example, a user's name.

In some embodiments, the drawing tool palette includes the elements listed in Table 10.

TABLE 10

| Button Tool Tip | Function |
| --- | --- |
| Highlighter Tool | The highlighter tool is selected by default. A user can click this toggle button to enter and exit an annotation mode that lets the user draw annotations, using the highlighter tool, on a document in the content viewer. In this drawing annotation mode, when the button is in its down state, the standard arrow pointer changes to the pointer for the highlighter tool, and a user can draw one or more annotations. |
| Pencil Tool | A user can click this toggle button to enter and exit an annotation mode that lets the user draw annotations, using the pencil tool, on a document in the content viewer. In this drawing annotation mode, when the button is in its down state, the standard arrow pointer changes to the pointer for the pencil tool, and a user can draw one or more annotations. |
| Line Tool | A user can click this toggle button to enter and exit an annotation mode that lets the user draw lines, using the line tool, on a document in the content viewer. In this drawing annotation mode, when the button is in its down state, the standard arrow pointer changes to the pointer for the line tool, and a user can draw one or more lines. |
| Ellipse Tool | A user can click this toggle button to enter and exit an annotation mode that lets the user draw ellipses, using the ellipse tool, on a document in the content viewer. In this drawing annotation mode, when the button is in its down state, the standard arrow pointer changes to the pointer for the ellipse tool, and a user can draw one or more ellipses. |
| Rectangle Tool | A user can click this toggle button to enter and exit an annotation mode that lets the user draw rectangles, using the rectangle tool, on a document in the content viewer. In this drawing annotation mode, when the button is in its down state, the standard arrow pointer changes to the pointer for the rectangle tool, and a user can draw one or more rectangles. |
| Arrow Tool | A user can click this toggle button to enter and exit an annotation mode that lets the user draw arrows, using the arrow tool, on a document in the content viewer. In this drawing annotation mode, when the button is in its down state, the standard arrow pointer changes to the pointer for the arrow tool, and a user can draw one or more arrows. |
| Double-Headed Arrow Tool | A user can click this toggle button to enter and exit an annotation mode that lets the user draw double-headed arrows, using the double-headed arrow tool on a document in the content viewer. In this drawing annotation mode, when the button is in its down state, the standard arrow pointer changes to the pointer for the double-headed arrow tool, and a user can draw one or more double-headed arrows. |
| Check Mark Tool | A user can click this toggle button to enter and exit an annotation mode that lets the user draw check marks, using the check-mark tool, on a document in the content viewer. In this drawing annotation mode, when the button is in its down state, the standard arrow pointer changes to the pointer for the check mark tool, and a user can draw one or more check marks. |
| X-Mark Tool | A user can click this toggle button to enter and exit an annotation mode that lets the user draw X-marks, using the X-mark tool, on a document in the content viewer. In this drawing annotation mode, when the button is in its down state, the standard arrow pointer changes to the pointer for the X-mark tool, and a user can draw one or more X-marks. |
| Annotation Color | A user can click this toggle button to display the Annotation Color palette at the location where the user last left it. As long as the Annotation Color palette remains open, this button is in its down state. Clicking the button again closes the Annotation Color palette. |

Figure 28:
FIG. 28 illustrates an Attendee Privileges dialog box, in accordance with some embodiments of the invention.

"Choosing the Privileges . . . " command on the Attendee menu displays the Attendee Privileges dialog box. FIG. 28 illustrates an Attendee Privileges dialog box 2800 in accordance with some embodiments of the invention. When a host or presenter chooses Privileges on the Attendee menu, without selecting an attendee in the attendee list, the Attendee Privileges dialog box appears, allowing the host or presenter to modify the privileges of all attendees. When a host or presenter selects an attendee in the attendee list, then chooses Privileges on the Attendee menu, the Attendee Privileges dialog box appears, allowing modification of the privileges of the selected attendee. Table 11 describes the elements in the Attendee Privileges dialog box.

TABLE 11

| Label or Name | Element | Function |
| --- | --- | --- |
| Close (This button has no label.) | Title bar button | The Close Button closes the Attendee Privileges dialog box. |
| All attendees | Option button | This option assigns the selected privileges to all attendees. If the host r presenter chooses Preferences on the Attendee menu without selecting an attendee list, this option is selected by default. |
| Selected attendee | Option button | This option assigns the selected privileges to only the selected attendee. If the host or presenter selects an attendee in the attendee list, then chooses Preferences on the Attendee menu, this option is selected by default. |
| Save | Check box | Allows attendees to save a shared document or presentation. This check box is deselected by default, and for all attendees, the Save and Save As submenus, and Save All Content command on the File menu, and the Save button on the toolbar appear dimmed. |
| Print | Check box | Allows attendees to print a shared document or presentation. This check box is deselected by default, and the attendees' Print submenu on the File menu appears dimmed. |
| Copy pages | Check box | Allows attendees to copy pages of a shared document or presentation. This check box is deselected by default, and the Copy Page command on the attendees' Edit menu appears dimmed. |
| Annotate | Check box | Allows attendees to annotate a shared document, presentation, application, Web browser, desktop, or whiteboard. This check box is deselected by default, and for all attendees, the Clear submenu on the Edit menu and the following elements on the toolbar appear dimmed: the Pointer Tool and Text Tool buttons; Highlighter Tool or other drawing tool button, and drop-down menu; Eraser Tool button and drop-down menu, and Annotation Color button and drop-down palette. This option now encompasses the ability to insert arrow annotations, called pointers. |

TABLE 11-continued

| Label or Name | Element | Function |
|---|---|---|
| Transfer | Check box | Allows attendees to transfer files. This check box is deselected by default, and the Transfer command on the attendees' File menu appears dimmed. |
| Attendee list | Check box | Allows attendees to view the content in the attendee list. This check box is selected by default. Attendees can always view the host and presenter in the attendee list, regardless of whether this check box is selected. |
| Video | Check box | Allows attendees to view video. This check box is deselected by default, and the Video option in the attendees' Panel drop-down list box appears dimmed. |
| Thumbnails | Check box | Allows attendees to view the thumbnail viewer, and use it to navigate to and view any page of a shared document, presentation or whiteboard. This check box is deselected by default, and for all attendees, the Thumbnails command on the View menu and the View Thumbnails button on the toolbar appear dimmed. When the attendee displays the thumbnail viewer, it appears in only that attendee's Meeting Center window. Navigating to another page using the controls in the thumbnail viewer affects only that attendee's view of the shared document, presentation, or whiteboard. |
| Any page | Check box | Allows attendees to navigate to and view any page of a shared document, presentation, or white board, by clicking either the Go To drop-down combo box, or the Previous Slide or Next Slide button on the toolbar. This check box is deselected by default, and for all attendees, the Synchronize My Display command on the View menu, and Go To drop-down combo box, and Previous Slide, Next Slide, and Synchronize My Display buttons on the toolbar appear dimmed. When an attendee navigates to another page, it affects only that attendee's view of the shared document, presentation, or whiteboard. |
| Record the Meeting | Check box | Allows attendees to record the meeting, and save the recording on their own hard disks or servers. This check box is deselected by default, and the start Recording and Recording Options commands on the Tools menu appear dimmed. |
| Share documents | Check box | Allows attendees to share documents, presentations, and whiteboards, and paste pages of a shared document or presentation. This check box is deselected by default, and for all attendees, the New Page command, Open submenu, and Close command on the File menu; Presentation or Document, Application, Web Browser, Desktop, and Whiteboard commands on the Share menu; and Open, Share Presentation or Document, and Laser Pointer buttons on the toolbar appear dimmed. |
| Public chat | Check box | Allows attendees to participate in public chat. The check box is deselected by default. |
| Private chat | Check box | Allows attendees to participate in private chat. This check box is selected by default. |
| Host | Check box | Allows attendees to chat privately with the meeting host. This option is selected by default. If the host or presenter deselects this check box, the options Host and Host and presenter appear dimmed in the attendees' Send to drop-down list box on the Chat tab. |
| Presenter | Check box | Allows attendees to chat privately with the current presenter. This option is selected by default. If the host or presenter deselects this check box, the Host and presenter option appears dimmed in the attendees' Send to drop-down list box on the Chat tab. |
| All attendees | Check box | Allows attendees to chat with all other attendees. This option is deselected by default. If the host or presenter selects this check box, all attendees' names appear in the Send drop-down list box on the Chat tab and are available. |
| All attendee privileges | Check box | Selects all other check boxes in the Attendee Privilege dialog box. |
| Assign | Button | Clicking this button closes the Attendee Privileges dialog box and applies changes to the attendee-privilege settings on all tabs. The Meeting Center window again becomes the active window. This button is the default button |
| Cancel | Button | Clicking Cancel closes the Attendee Privileges dialog box without changing any settings, and the Meeting Center window again becomes the active window. |

Microsoft, Word, PowerPoint, Internet Explorer, and Windows are trademarks of Microsoft, Inc. Shockwave and Flash are trademarks of Macromedia, Inc. QuickTime is a trademark of Apple Computer, Inc. Real is a trademark of RealNetworks, Inc. DB2 is a trademark of International Business Machines, Inc. Oracle is a trademark of Oracle, Corp. Pentium is a trademark of Intel, Corp. UltraSparc is a trademark of Sun Microsystems, Inc. Corel and WordPerfect are trademarks of Corel Corporation.

Although the invention has been described with reference to particular embodiments, the description is only an example of the invention's application and should not be taken as a limitation.

The order in which the steps of the present technique are performed is purely illustrative in nature. In fact, the stages in the flow diagrams described herein may be performed in any order or in parallel, unless otherwise indicated by the present disclosure.

The technique of the present invention may be performed in either hardware, software, or any combination thereof. In particular, the invention may be carried out by software, firmware, microcode operating on a computer or computers of any type.

Additionally, software embodying the invention comprise computer instructions in any form (e.g., source code, object code, interpreted code) stored in any computer-readable medium (e.g., ROM, RAM, magnetic media, punched tape or card, CD, DVD). Thus, the invention may be tangibly embodied as software in a computer-readable device or media, such as memory, data storage devices, and/or data communication devices, thereby making a product or article of manufacture according to the invention. As such, the terms "article of manufacture" and "computer program product" and "computer-readable storage medium" as used herein are intended to encompass software accessible from any computer readable device or media.

Furthermore, such software may also be in the form of a computer data signal embodied in a carrier wave, such as that found within the well-known Web pages transferred among computers connected to the Internet. Accordingly the present invention is not limited to any particular platform unless specifically stated otherwise in the present disclosure. Using the present specification, the invention may be implemented as a machine, process, or article of manufacture by using programming and/or engineering techniques to produce software, firmware, hardware, or any combination thereof.

While particular embodiments of the present invention have been shown and described, it will be apparent to those skilled in the art that changes and modifications may be made without departing from this invention in its broader aspect, and, therefore, the appended claims are to encompass within their scope all such changes and modifications as fall within the true spirit of this invention.

We claim:

1. A computer system for sharing a document in a distributed collaborative environment:
   a presenter client computer;
   one or more computer programs executable by the presenter client computer,
   wherein the one or more computer programs comprise computer instructions for:
     creating a document with one or more embedded custom objects, wherein the embedded custom objects include a video object;
     converting the document to a rich multi-media format; and
     controlling rendering of the document during a collaborative session;
   a conferencing server computer connected to the presenter client computer and to one or more attendee client computers via a global-area network; and
   a computer program at the conferencing server computer, wherein the computer program comprises instructions for:
     receiving the document and forwarding the document to each of the attendee client computers to be downloaded onto each of the attendee client computers before the collaborative session;
     receiving a remote command for sharing the document from the presenter client computer during the collaborative session; and
     forwarding the remote command to each of the attendee client computers, wherein each of the attendee client computers renders its locally downloaded document according to the received remote command such that playback of the video object embedded in the locally downloaded document at each of the attendee client computers is remotely controlled by the remote command to be in synch with the presenter computer.

2. The computer system of claim 1, further comprising:
   a computer program executable by each attendee client computer, wherein the computer program comprises computer instructions for:
     receiving a command from the conferencing server computer; and
     executing the command to render the document in synch with the presenter client computer.

3. The computer system of claim 2, further comprising:
   a streaming server computer connected to the presenter client computer and the one or more attendee client computers via a global-area network for storing data to be accessed by the client computers during a collaborative session.

4. The computer system of claim 1, wherein the custom objects embedded in the document downloaded to each of the attendee client computers before the collaborative session include a media object, and each of the attendee client computers plays the media object embedded in its locally downloaded document according to another remote command from the presenter computer such that playback of the media object at each of the attendee client computers is in synch with the presenter computer.

5. The computer system of claim 4, wherein the embedded media object is selected from the group consisting of a video object, an audio object, a 3D model and a meeting recording object.

6. The computer system of claim 1, wherein each attendee computer comprises a local viewer program that is remotely controlled by the remote command from the presenter computer to play the video object embedded in the locally downloaded document in sync with the presenter computer.

7. A method for sharing a document between a first computer and one or more additional attendee computers, the method comprising:
   creating a document with one or more embedded custom objects at the first computer, wherein the embedded custom object include a video object;
   converting the document to a rich multi-media format;
   downloading the document onto the one or more additional attendee computers before a collaborative session; and
   remotely controlling rendering of the locally downloaded document at each of the attendee computers from the first computer during the collaborative session such that playback of the video object embedded in the locally downloaded document at each of the attendee computers is remotely controlled by the first computer to be in synch with the first computer.

8. The method of claim 7, wherein controlling rendering further comprises:
   under control of the a first computer, transmitting a command for sharing the document to a second computer for transmission to the one or more additional attendee computers, such that the command is executed synchronously at the first computer and each of the one or more additional attendee computers.

9. The method of claim 8, further comprising:
   under control of each of the one or more additional attendee computers, receiving the command from the second computer; and
   executing the command to render the document in synch with the first computer.

10. The method of claim 9, further comprising:
    accessing a streaming server computer for data required to render the document.

11. A computer-readable storage medium storing a computer program executable by a first computer for sharing a document between the first computer and one or more additional attendee computers, the computer program comprising computer instructions for:
    creating a document with one or more embedded custom objects at the first computer, wherein the embedded custom object include a video object;
    converting the document to a rich multi-media format;
    downloading the document onto the one or more additional attendee computers before a collaborative session; and
    remotely controlling rendering of the locally downloaded document at each of the attendee computers from the first computer during the collaborative session such that playback of the video object embedded in the locally downloaded document at each of the attendee computers is remotely controlled by the first computer to be in synch with the first computer.

12. The computer-readable storage medium of claim 11, wherein the computer program further comprises computer instructions for:

transmitting a command for sharing the document from the first computer to a second computer for transmission to the one or more additional attendee computers, such that the command is executed synchronously at the first computer and each of the one or more additional attendee computers.

13. The computer-readable storage medium of claim 11, wherein the computer program further comprises computer instructions for:

accessing a streaming server computer for data required to render the document.

* * * * *

UNITED STATES PATENT AND TRADEMARK OFFICE
CERTIFICATE OF CORRECTION

PATENT NO.       : 7,636,754 B2                                      Page 1 of 1
APPLICATION NO.  : 10/104170
DATED            : December 22, 2009
INVENTOR(S)      : Zhu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Twenty-first Day of December, 2010

David J. Kappos
*Director of the United States Patent and Trademark Office*